US011767106B1

(12) United States Patent
Lauder et al.

(10) Patent No.: US 11,767,106 B1
(45) Date of Patent: Sep. 26, 2023

(54) ELECTRIC VERTICAL TAKE OFF AND LANDING VEHICLE

(71) Applicant: LOCKHEED MARTIN CORPORATION, Bethesda, MD (US)

(72) Inventors: Timothy F. Lauder, Oxford, CT (US); Mark W. Scott, Bethany, CT (US); Michael Strauss, New Haven, CT (US); Jonathan D. Hartman, Southington, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 248 days.

(21) Appl. No.: 17/007,307

(22) Filed: Aug. 31, 2020

Related U.S. Application Data

(60) Provisional application No. 62/894,268, filed on Aug. 30, 2019.

(51) Int. Cl.
| | |
|---|---|
| *B64C 27/14* | (2006.01) |
| *B64D 27/24* | (2006.01) |
| *B64C 27/10* | (2023.01) |
| *B64D 27/02* | (2006.01) |

(52) U.S. Cl.
CPC .............. *B64C 27/14* (2013.01); *B64C 27/10* (2013.01); *B64D 27/24* (2013.01); *B64D 2027/026* (2013.01)

(58) Field of Classification Search
CPC .......... B64C 27/10; B64C 27/14; B64D 27/24
See application file for complete search history.

(56) References Cited

U.S. PATENT DOCUMENTS

| | | |
|---|---|---|
| 7,802,755 B2 | 9/2010 | Poltorak |
| 8,919,692 B2 | 12/2014 | Halcom |
| 8,931,732 B2 | 1/2015 | Sirohi et al. |
| 8,944,367 B2 | 2/2015 | Bystry, Jr. et al. |
| 8,948,928 B2 | 2/2015 | Alber et al. |
| 9,026,274 B2 | 5/2015 | Hartman et al. |
| 9,828,089 B2 | 11/2017 | Lauder et al. |
| 10,040,566 B2 | 8/2018 | Waltner |
| 10,309,304 B2 | 6/2019 | Bourne et al. |
| 2013/0233977 A1 | 9/2013 | Smiley et al. |
| 2015/0100181 A1 | 4/2015 | Strauss et al. |
| 2017/0129597 A1 | 5/2017 | Lauder et al. |
| 2017/0210480 A1* | 7/2017 | Lauder .................. B64C 27/10 |
| 2017/0297689 A1 | 10/2017 | Lauder et al. |

(Continued)

FOREIGN PATENT DOCUMENTS

WO    2014/182616    11/2014

*Primary Examiner* — Timothy D Collins
*Assistant Examiner* — Justin Michael Heston
(74) *Attorney, Agent, or Firm* — Baker Botts L.L.P.

(57) ABSTRACT

An aircraft includes an airframe, and a coaxial main rotor assembly including a static mast and an upper rotor assembly and a lower rotor assembly rotatable about a main rotor axis defined by the static mast. The upper rotor assembly and the lower rotor assembly are independently rotatable about the static mast. A propulsion system includes at least one propulsion source for directly driving at least one of the upper rotor assembly and the lower rotor assembly and a flight control system is operably coupled to the propulsion system. The flight control system is operable to independently control a rotational speed of the upper rotor assembly and the lower rotor assembly relative to the static mast.

11 Claims, 25 Drawing Sheets

(56) References Cited

U.S. PATENT DOCUMENTS

| | | |
|---|---|---|
| 2018/0111680 A1 | 4/2018 | Fenny et al. |
| 2019/0023383 A1* | 1/2019 | Lauder .................. B64C 27/59 |
| 2019/0023384 A1 | 1/2019 | Lauder |
| 2019/0023385 A1 | 1/2019 | Nguyen |
| 2019/0210717 A1* | 7/2019 | Lauder .................. B64C 27/32 |

* cited by examiner

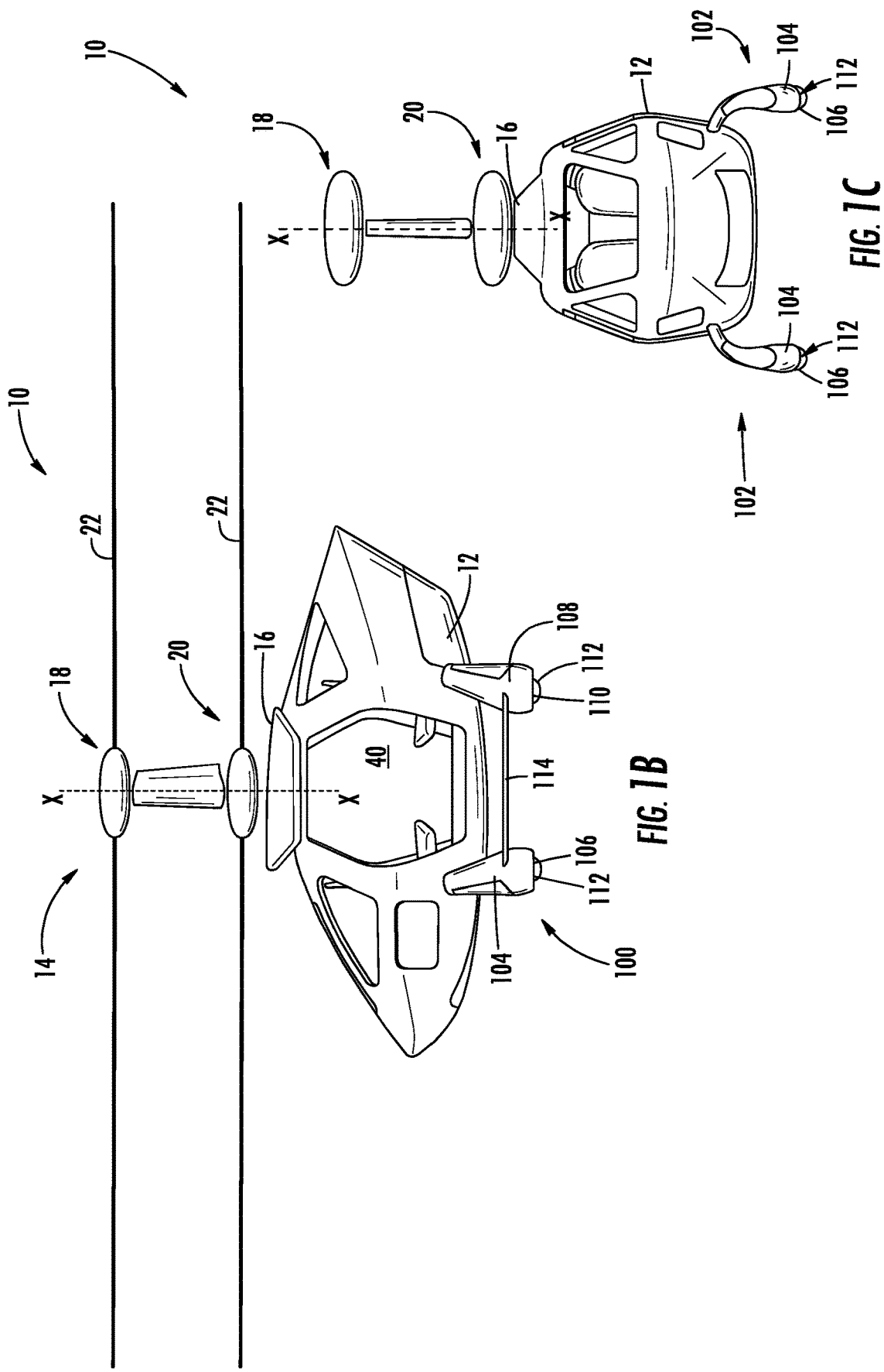

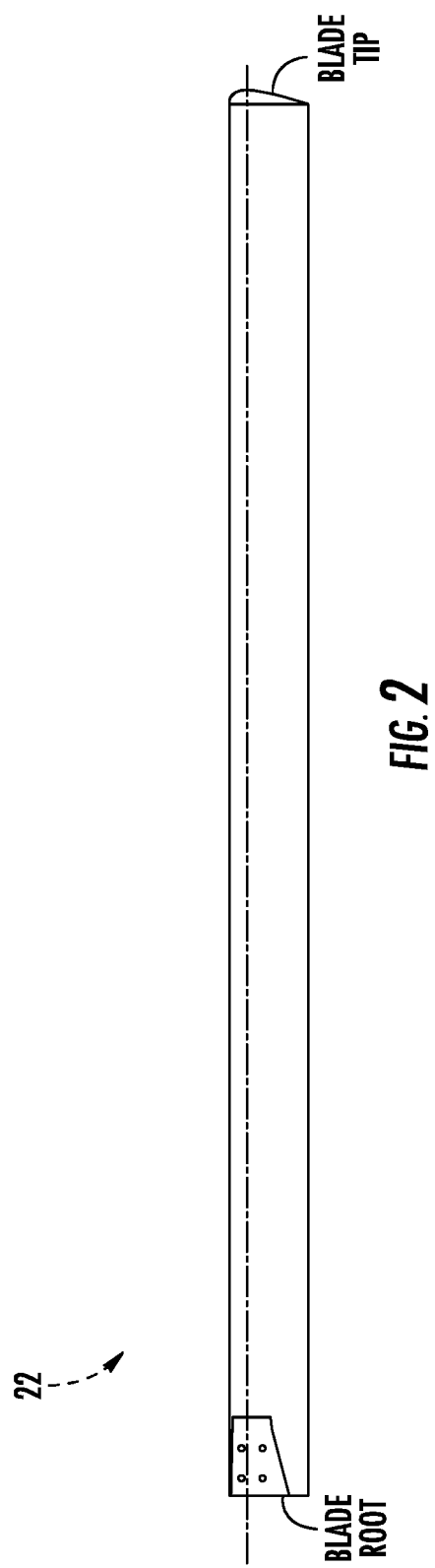

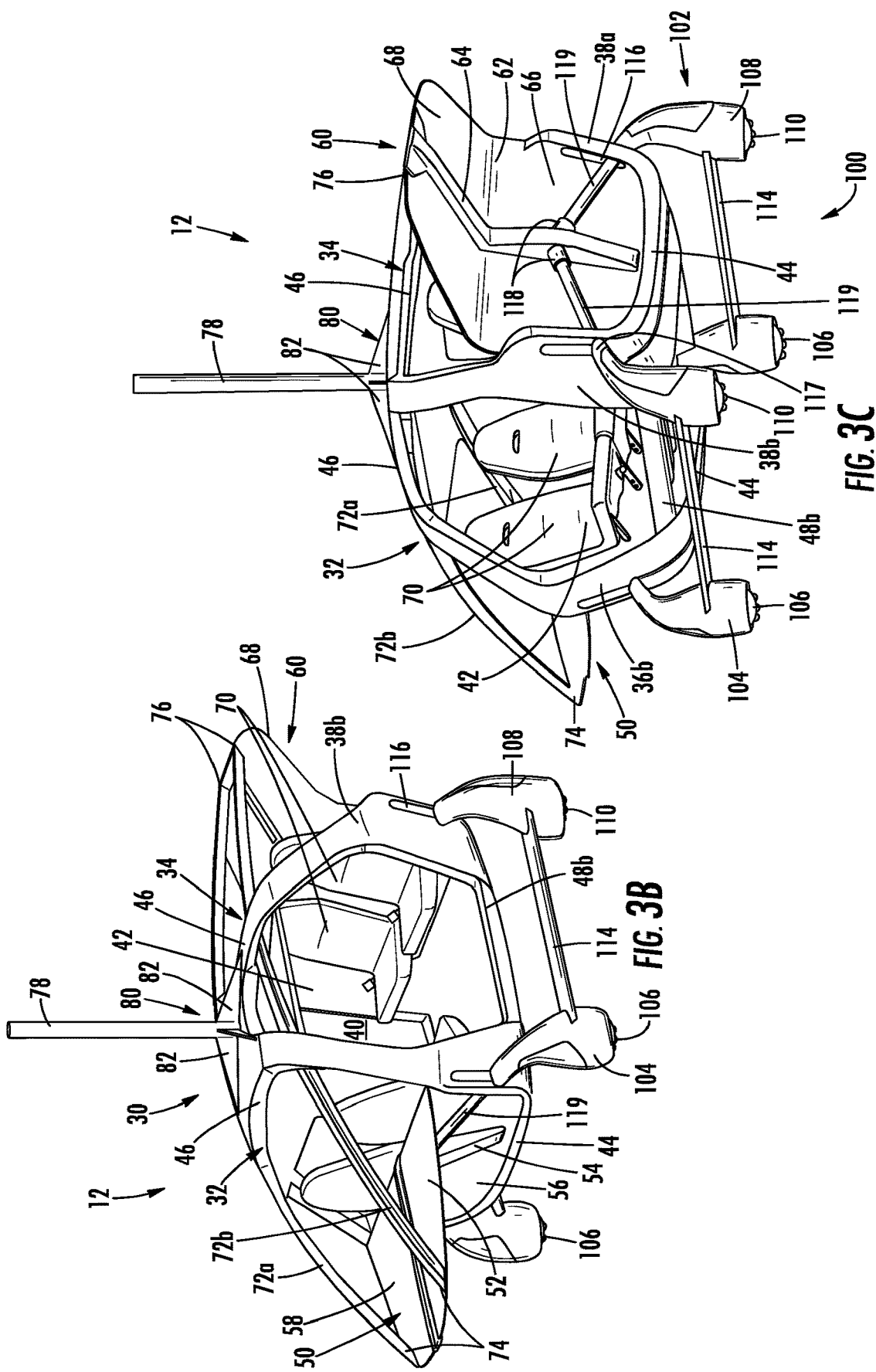

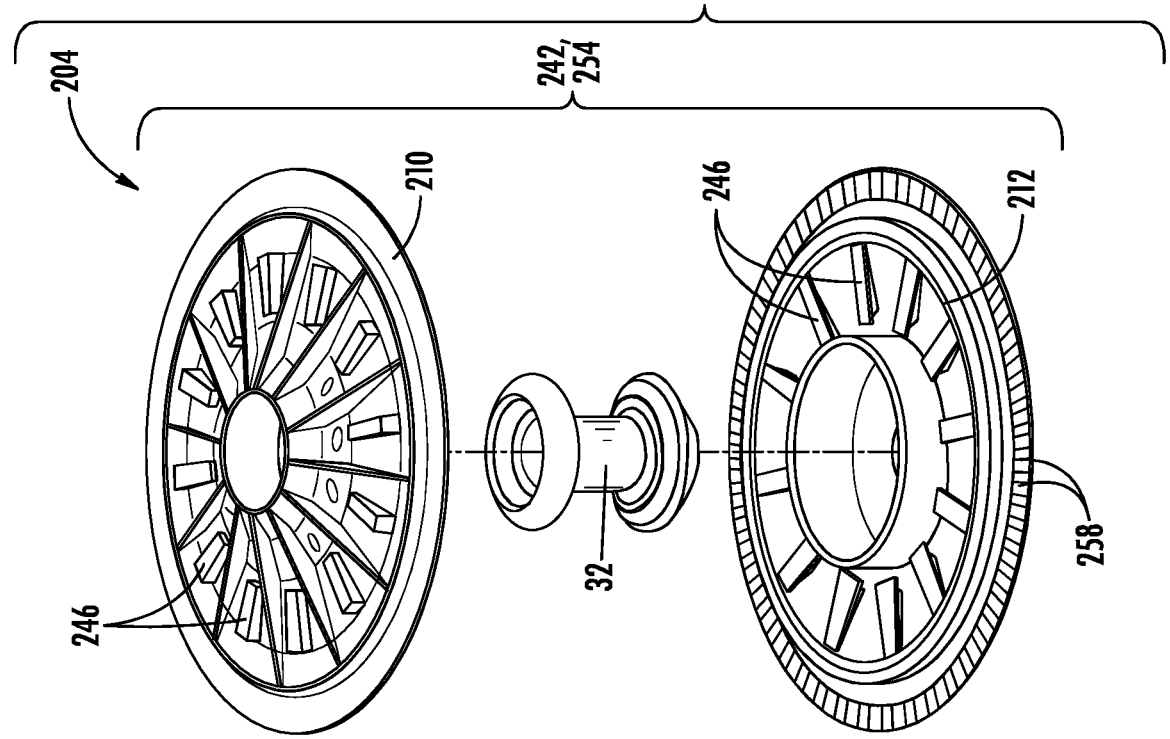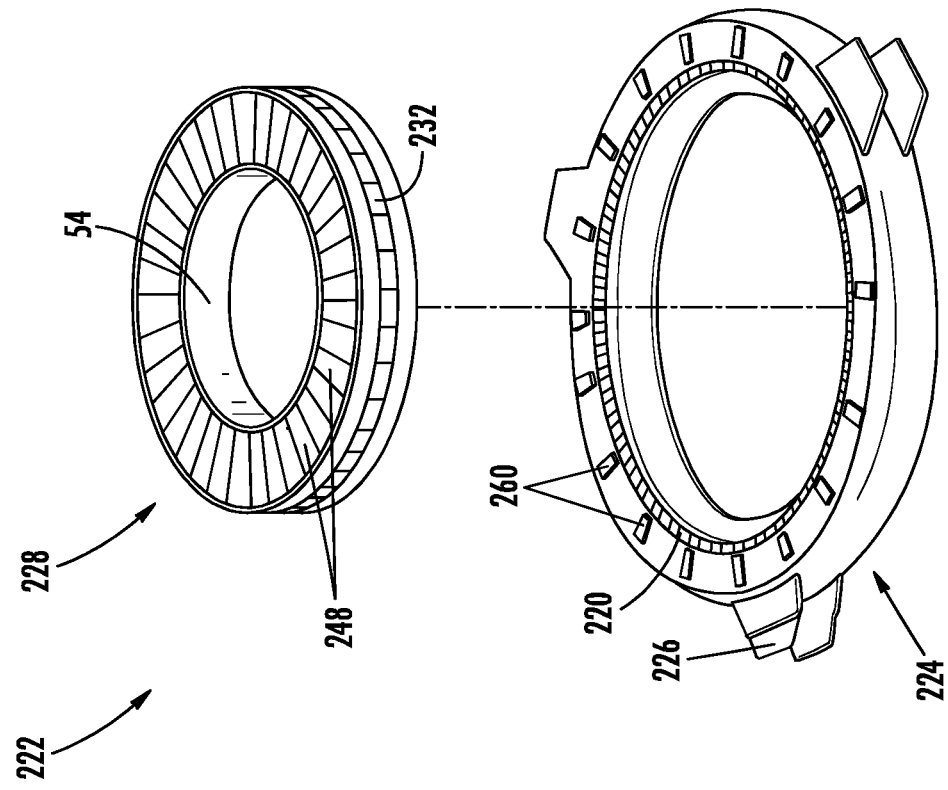
FIG. 16

ELECTRIC VERTICAL TAKE OFF AND LANDING VEHICLE

CROSS REFERENCE TO RELATED APPLICATION

This application claims priority to U.S. Provisional Application No. 62/894,268 filed Aug. 30, 2019, which is incorporated herein by reference in its entirety.

BACKGROUND

The present disclosure relates to a rotary wing aircraft, and more particularly, to a rotary wing aircraft having an electric propulsion system.

Rotary wing aircraft utilize propulsion systems to power aircraft flight. These propulsion systems convert stored energy into mechanical work to drive one or more rotor systems for flight. Energy (typically stored in chemical form as consumable fuel) is supplied to an energy conversion device (typically a plurality of internal combustion engines such as a turbine engine, spark ignition engine, or compression ignition engine), which converts the energy into mechanical work. A drive system transmits mechanical work through a plurality of transmission mechanisms (e.g., main rotor gearbox(es), a tail rotor gearbox, auxiliary propulsor gearbox(es), drive shafts, drive couplings, etc.) to drive the rotary wing aircraft's thrust generating rotors. As these mechanical transmission devices transmit mechanical power from the engines along this chain of components, they experience a large number of fatigue cycles. Each component designed for fatigue life is typically overdesigned to meet the component life requirement, which adds weight to the component. Each component in the chain that physically engages another such as, e.g., gears and bearings, generates heat from friction and requires lubrication to minimize friction losses and a cooling system to reject heat. Lubrication and cooling systems add weight to the conventional rotorcraft. Additionally, these mechanical transmission devices must also be supported by strengthened airframe structure which further increases vehicle weight. To change the direction of the mechanical transmission, angled bevel gears requiring thrust force reaction are needed. This thrust force reaction along the gear requires additional weight from bearings, shafts and housing structure.

Additionally, electricity for supplying the aircraft's electrical load may be supplied through a plurality of generators which are mounted to the main rotor gearbox(es) or engine(s). For a typical aircraft, the energy demand of the engine differs depending on the flight segment such as steady/level flight, take off, vertical landing, hover, or during emergency conditions, etc. As a result, the engine may not operate near its peak efficiency during off-design point power conditions. For missions where the rotorcraft demand is mostly for the off-design point power segment of flight, the rotorcraft may generally exhibit lower efficiency. A propulsion system for a rotary wing aircraft that uses an electrical propulsion system will increase the operational efficiency of the vehicle, resulting in reduced acquisition and operating costs and providing greater value to the operator of the aircraft. Furthermore, use of an electrical propulsion system will reduce the acoustic signature, mechanical complexity, improve reliability, and reduce maintenance burden to provide greater value to the operator of the aircraft.

BRIEF DESCRIPTION

According to an embodiment, an aircraft includes an airframe, and a coaxial main rotor assembly including a static mast and an upper rotor assembly and a lower rotor assembly rotatable about a main rotor axis defined by the static mast. The upper rotor assembly and the lower rotor assembly are independently rotatable about the static mast. A propulsion system includes at least one propulsion source for directly driving at least one of the upper rotor assembly and the lower rotor assembly and a flight control system is operably coupled to the propulsion system. The flight control system is operable to independently control a rotational speed of the upper rotor assembly and the lower rotor assembly relative to the static mast.

In addition to one or more of the features described above, or as an alternative, in further embodiments a blade pitch of the upper rotor assembly and a blade pitch of the lower rotor assembly are controllable by the flight control system.

In addition to one or more of the features described above, or as an alternative, in further embodiments the at least one propulsion source includes an electric motor.

In addition to one or more of the features described above, or as an alternative, in further embodiments the at least one propulsion source further comprises a single propulsion source operable to rotate the upper rotor assembly about the main rotor axis in a first direction and rotate the lower rotor assembly about the main rotor axis in a second direction.

In addition to one or more of the features described above, or as an alternative, in further embodiments the at least one propulsion source further comprises: a first propulsion source directly coupled to the upper rotor assembly, the first propulsion source being operable to rotate the upper rotor assembly about the main rotor axis in a first direction and a second propulsion source directly coupled to the lower rotor assembly, the second propulsion source being independent from the first propulsion source and operable to rotate the lower rotor assembly about the main rotor axis in a second direction.

In addition to one or more of the features described above, or as an alternative, in further embodiments the flight control system is operably coupled to the first propulsion system and the second propulsion system, wherein the flight control system is operable to control aircraft yaw via operation of the first propulsion system and the second propulsion system.

In addition to one or more of the features described above, or as an alternative, in further embodiments both the first propulsion source and the second propulsion source are electric motors.

In addition to one or more of the features described above, or as an alternative, in further embodiments at least one of the first propulsion source is mounted within the upper rotor assembly and the second propulsion source is mounted within the lower rotor assembly.

In addition to one or more of the features described above, or as an alternative, in further embodiments the airframe further comprises a static mast defining the main rotor axis, and the upper rotor assembly and lower rotor assembly are rotatable relative to the static mast.

In addition to one or more of the features described above, or as an alternative, in further embodiments at least one of the upper rotor assembly and the lower rotor assembly includes: a stationary rotor hub assembly, a rotating system rotatably mounted to the stationary rotor hub assembly, and an electric motor including a stator assembly associated with the rotor hub assembly and a rotor assembly associated with the rotating system.

In addition to one or more of the features described above, or as an alternative, in further embodiments the rotating system includes a rotor head associated with an over-running clutch.

In addition to one or more of the features described above, or as an alternative, in further embodiments the rotor assembly is driven by the over-running clutch.

In addition to one or more of the features described above, or as an alternative, in further embodiments at least one of the upper rotor assembly and the lower rotor assembly includes a power generation unit In addition to one or more of the features described above, or as an alternative, in further embodiments the flight control system is operably coupled to the power generation unit, the flight control system being operable to alter a torque of the at least one of the upper rotor assembly and the lower rotor assembly without decreasing a rotational speed of the at least one of the upper rotor assembly and the lower rotor assembly.

According to another embodiment, a method of generating a yaw moment in a coaxial rotary wing aircraft having an upper rotor assembly and a lower rotor assembly includes receiving, via a flight control system, at least one input related to operation of the coaxial rotary wing aircraft, determining, via a computing device of the flight control system comprising a processor, a yaw moment in response to the at least one input related to operation of the coaxial rotary wing aircraft, and controlling rotation of the upper rotor assembly about main rotor axis independently of rotation of the lower rotor assembly about the main rotor axis to create the yaw moment.

In addition to one or more of the features described above, or as an alternative, in further embodiments comprising generating a torque imbalance between the upper rotor assembly and the lower rotor assembly in response to controlling wherein controlling rotation of the upper rotor assembly independently of rotation of the lower rotor assembly.

In addition to one or more of the features described above, or as an alternative, in further embodiments controlling rotation of the upper rotor assembly independently of rotation of the lower rotor assembly includes rotating the upper rotor assembly at a first speed and rotating the lower rotor assembly at a second speed different from a first speed.

In addition to one or more of the features described above, or as an alternative, in further embodiments controlling rotation of the upper rotor assembly about the main rotor axis further comprises operating a first propulsion source associated with the upper rotor assembly in response to a first command generated by the computing device and controlling rotation of the lower rotor assembly about the main rotor axis further comprises operating a second propulsion source associated with the lower rotor assembly in response to a second command generated by the computing device.

In addition to one or more of the features described above, or as an alternative, in further embodiments the first propulsion source and the second propulsion source are independently operable.

In addition to one or more of the features described above, or as an alternative, in further embodiments at least one of the first command and the second command includes one or more of a torque command and a rotor speed command.

In addition to one or more of the features described above, or as an alternative, in further embodiments comprising distributing electrical power from an energy source to the first propulsion source and the second propulsion source in response to the first command and the second command.

In addition to one or more of the features described above, or as an alternative, in further embodiments distributing electrical power from an energy source to the first propulsion source and the second propulsion source further comprises converting mechanical energy into electrical energy.

In addition to one or more of the features described above, or as an alternative, in further embodiments comprising adjusting a torque of at least one of the upper rotor assembly and the lower rotor assembly without decreasing a rotational speed of the rotor hub.

According to yet another embodiment, an aircraft includes an airframe including a primary structure, wherein the primary structure is a spider frame, and a counter rotating, coaxial main rotor assembly including a stationary mast defining a main rotor axis and an upper rotor assembly and lower rotor assembly rotatable about the main rotor axis. The main rotor assembly is connected to the spider frame such that flight loads of the main rotor assembly are equally distributed across the spider frame.

In addition to one or more of the features described above, or as an alternative, in further embodiments the spider frame is symmetrical about a plane including a vertical axis of the airframe along a longitudinal axis of the aircraft.

In addition to one or more of the features described above, or as an alternative, in further embodiments the spider frame is asymmetric about a plane including a vertical axis of the airframe along a longitudinal axis of the aircraft.

In addition to one or more of the features described above, or as an alternative, in further embodiments the spider frame further comprises a front frame and a rear frame, the front frame and the rear frame extending between an upper extent and a lower extent of the aircraft, wherein each of the front frame and the rear frame includes a left frame member and a right frame member.

In addition to one or more of the features described above, or as an alternative, in further embodiments the aircraft further comprises a cabin, and an interior volume of the cabin is defined between the front frame and the rear frame.

In addition to one or more of the features described above, or as an alternative, in further embodiments a clearance defined between a first side of the front frame and a first side of the rear frame forms an opening in communication with the cabin.

In addition to one or more of the features described above, or as an alternative, in further embodiments the primary structure of the airframe further comprises at least one lower longeron extending between the front frame and the rear frame.

In addition to one or more of the features described above, or as an alternative, in further embodiments the front frame, the rear frame, and the at least one lower longeron cooperate to support a floor of the aircraft.

In addition to one or more of the features described above, or as an alternative, in further embodiments the primary structure of the airframe further comprises at least one upper longeron extending fore and aft of the front frame and the rear frame to define a nose and tail of the aircraft.

In addition to one or more of the features described above, or as an alternative, in further embodiments the front frame, the rear frame, and the at least one upper longeron cooperate to support a ceiling of the aircraft.

In addition to one or more of the features described above, or as an alternative, in further embodiments the primary structure is integrally formed as a composite body.

In addition to one or more of the features described above, or as an alternative, in further embodiments comprising an energy storage system associated with the coaxial main rotor assembly, wherein the energy storage system is supported by the primary structure.

In addition to one or more of the features described above, or as an alternative, in further embodiments at least a portion of the energy storage system is supported by the rear frame of the primary structure.

In addition to one or more of the features described above, or as an alternative, in further embodiments comprising a first bulkhead extending from the front frame in a first direction and a second bulkhead extending from the rear frame in a second direction.

In addition to one or more of the features described above, or as an alternative, in further embodiments a fore compartment is defined beneath the first bulkhead and an aft compartment is defined beneath the second bulkhead.

In addition to one or more of the features described above, or as an alternative, in further embodiments further comprising a propulsion system operably coupled to the main rotor assembly, wherein one or more components of the propulsion system are mounted in at least one of the fore compartment and the aft compartment.

In addition to one or more of the features described above, or as an alternative, in further embodiments a seat is integrally formed with at least one of the first bulkhead and the second bulkhead.

In addition to one or more of the features described above, or as an alternative, in further embodiments comprising a landing gear system mounted to the primary structure of the airframe.

According to another embodiment, a landing gear assembly for a rotary wing aircraft includes a first landing gear support having a first ground contact element, a second landing gear support having a second ground contact element, a drive motor connected to the first ground contact element, and a controller operably coupled to the drive motor to move the landing gear assembly about at least two degrees of freedom.

In addition to one or more of the features described above, or as an alternative, in further embodiments the second ground contact element is passive.

In addition to one or more of the features described above, or as an alternative, in further embodiments the plurality of axes includes a substantially vertical axis.

In addition to one or more of the features described above, or as an alternative, in further embodiments the first ground contact element and the second ground contact element are mecanum wheels.

In addition to one or more of the features described above, or as an alternative, in further embodiments the drive motor is connected to the second ground contact element.

In addition to one or more of the features described above, or as an alternative, in further embodiments comprising a second drive motor connected to the second ground contact element, the controller being operably coupled to the second drive motor to move the second ground contact element independently from the first ground contact element.

According to yet another embodiment, a rotary wing aircraft includes an airframe and a main rotor assembly mounted to the airframe. The main rotor assembly is rotatable about a main rotor axis. A landing gear assembly is affixed to the airframe and includes at least one ground contact element is rotatable about only a single axis of rotation. A landing gear propulsion system is associated with the landing gear assembly. The landing gear propulsion system is operable to move the rotary wing aircraft about multiple degrees of freedom when the rotary wing aircraft is supported by the landing gear assembly.

In addition to one or more of the features described above, or as an alternative, in further embodiments the landing gear propulsion system is operable to move the rotary wing aircraft in any direction without changing an orientation of the rotary wing aircraft.

In addition to one or more of the features described above, or as an alternative, in further embodiments the landing gear assembly further comprises a first landing gear support having a first ground contact element and a second landing gear support having a second ground contact element, and the landing gear propulsion system further comprises a drive motor connected to the first ground contact element and a landing gear motor controller operably coupled to the drive motor to move the first ground contact element.

In addition to one or more of the features described above, or as an alternative, in further embodiments the drive motor is electrically powered.

In addition to one or more of the features described above, or as an alternative, in further embodiments the second ground contact element is passive.

In addition to one or more of the features described above, or as an alternative, in further embodiments at least one of the the first ground contact element and the second ground contact element includes a wheel having at least one roller mounted about a circumference of the wheel.

In addition to one or more of the features described above, or as an alternative, in further embodiments the first ground contact element and the second ground contact element are mecanum wheels.

In addition to one or more of the features described above, or as an alternative, in further embodiments the drive motor is connected to the second ground contact element.

In addition to one or more of the features described above, or as an alternative, in further embodiments comprising a second drive motor connected to the second ground contact element, the controller being operably coupled to the second drive motor to move the second ground contact element independently from the first ground contact element.

In addition to one or more of the features described above, or as an alternative, in further embodiments the first landing gear support is mounted adjacent a first side of the airframe and the second landing gear support is mounted adjacent a second, opposite side of the airframe.

In addition to one or more of the features described above, or as an alternative, in further embodiments both the first landing gear support and the second landing gear support are mounted adjacent a first side of the airframe.

In addition to one or more of the features described above, or as an alternative, in further embodiments comprising a flight control system operable to control the main rotor assembly in response to one or more inputs.

In addition to one or more of the features described above, or as an alternative, in further embodiments the landing gear motor controller is operably coupled to the flight control system and is operable to send commands to the drive motor in response to the one or more inputs received by the flight control system.

In addition to one or more of the features described above, or as an alternative, in further embodiments the landing gear propulsion system associated is operable to move the rotary wing aircraft when the main rotor assembly is stationary.

According to another embodiment, an aircraft includes an airframe having a cabin for carrying at least one passenger, and a counter rotating, coaxial main rotor assembly including an upper rotor assembly and a lower rotor assembly rotatable about a main rotor axis. Each of the upper rotor assembly and the lower rotor assembly includes a plurality of rotor blades. One or more of a diameter, rotational speed, and disk loading of at least one of the upper rotor assembly and the lower rotor assembly is selected to minimize a noise generated by the main rotor assembly. At least one propulsion source is operable to rotate the upper rotor assembly and the lower rotor assembly about the main rotor axis. A flight control system is operable to independently control the upper rotor assembly and the lower rotor assembly. During operation, the aircraft has a loudness value of less than or equal to about 20 phon observed at a direct-line distance of 150 ft at an angle of 45 degrees from the ground plane.

In addition to one or more of the features described above, or as an alternative, in further embodiments the plurality of rotor blades of at least one of the upper rotor assembly and the lower rotor assembly rotate about the main rotor axis at an operational tip speed of less than 550 ft/s.

In addition to one or more of the features described above, or as an alternative, in further embodiments the upper rotor assembly and the lower rotor assembly have a rotor disk loading equal to approximately half of a rotor disk loading of a comparably sized rotary wing aircraft.

In addition to one or more of the features described above, or as an alternative, in further embodiments the fundamental rotor noise frequency is between 50 Hz and 100 Hz.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 1B is a side view of the vertical takeoff and landing (VTOL) rotary wing aircraft of FIG. 1A with one or more doors in an open position according to an embodiment;

FIG. 1C is a front view of the vertical takeoff and landing (VTOL) rotary wing aircraft of FIG. 1A according to an embodiment;

FIG. 2 is a plan view of a rotor blade assembly for use with a vertical takeoff and landing (VTOL) rotary wing aircraft according to an embodiment;

FIG. 3B is another perspective view of an airframe of the vertical takeoff and landing (VTOL) rotary wing aircraft according to an embodiment;

FIG. 3C is yet another perspective view of an airframe of the vertical takeoff and landing (VTOL) rotary wing aircraft according to an embodiment;

FIG. 16 is a perspective view of various components that define the electric motor of the propulsion system according to an embodiment;

DETAILED DESCRIPTION

Figure 1A:
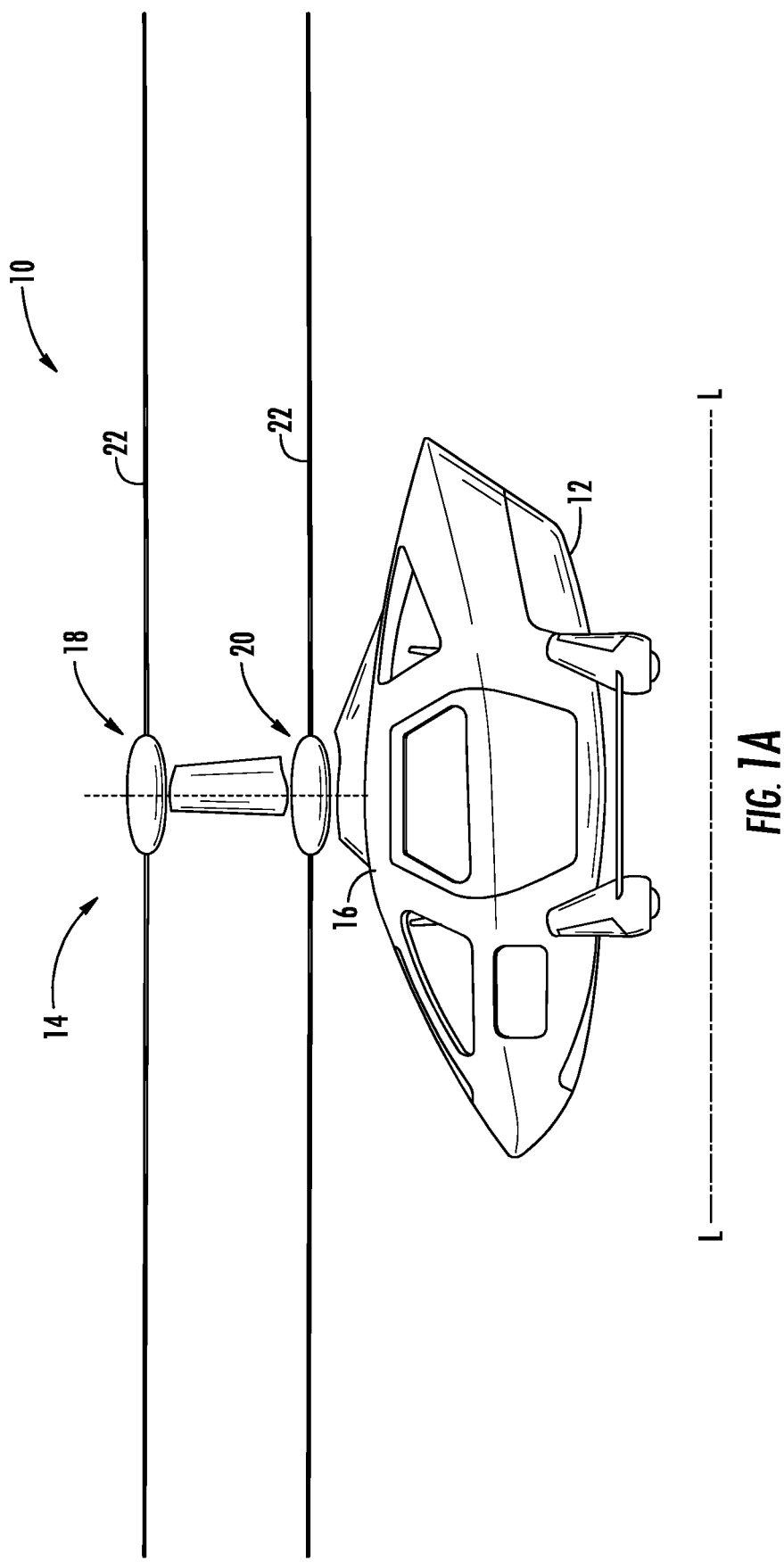
FIG. 1A is a side view of a vertical takeoff and landing (VTOL) rotary wing aircraft according to an embodiment.

Referring now to FIGS. 1A-1C, an example of a rotary wing, vertical takeoff and landing (VTOL) aircraft 10, such as a helicopter for example, is illustrated. The aircraft 10 includes an airframe 12 and a main rotor assembly 14 extending from an upper surface 16 of the airframe 12. In the illustrated, non-limiting embodiment, the main rotor assembly 14 is a dual, counterrotating, coaxial main rotor assembly 14, rotatable about a main rotor axis X. The main rotor assembly 14 includes an upper rotor assembly 18 rotatably driven in a first direction (i.e. counter-clockwise) about the main rotor axis X, and a lower rotor assembly 20 driven in a second direction (i.e. clockwise) about the main rotor axis X, opposite to the first direction by a propulsion system 21, to be described in more detail below. Each of the upper rotor assembly 18 and the lower rotor assembly 20 includes a plurality of rotor blades 22 secured to a rotor hub, as will be described in more detail below.

The rotor blades 22 of the upper rotor assembly 18 may be substantially mirror images to the rotor blades 22 of the lower rotor assembly 20; however, embodiments where a configuration of one or more of the rotor blades varies between the upper and lower rotor assembly 18, 20 are also within the scope of the disclosure. In addition, in the illustrated, non-limiting embodiment, each of the upper rotor assembly 18 and the lower rotor assembly 20 of the main rotor assembly 14 has two rotor blades 22 mounted thereto, at a position diametrically opposite one another. It should be understood that the embodiments shown in the FIGS. 1A-1C are intended as an example only, and that embodiments of the aircraft 10 having any suitable number of rotor blades coupled to each of the upper and lower rotors 18, 20 are also contemplated herein.

With reference now to FIG. 2, a planform of an example of a rotor blade 22 suitable for use with either the upper or lower rotor assembly 18, 20 is illustrated. In the illustrated, non-limiting embodiment, the rotor blade 22 has a constant chord extending from the root to the tip and the tip of the rotor blade does not have any sweep. However, it should be understood that a rotor blade having another configuration, such as a varied chord for example, is also within the scope of the disclosure. The rotor blade 22 may be connected to a rotor hub of one of the upper and lower rotors 18, 20 in a hinged or hingeless manner such that the main rotor assembly 14 could be a semi-rigid rotor system. However, embodiments where one or more rotor blade 22 of at least one of the upper rotor assembly 18 and the lower rotor assembly 20 are foldable about a blade fold axis (not shown), for example to reduce the sizing envelope of the aircraft 10 when in a stowed configuration are also contemplated herein. Although a particular helicopter configuration is schematically illustrated in the disclosed non-limiting embodiments, other configurations and/or machines, such as a rotary wing aircraft having a single rotor system, tilt-rotors and tilt-wing aircraft in either manned or unmanned configurations will also benefit. For example, although the aircraft is shown as having only a main rotor assembly 14, embodiments where the aircraft 10 is adapted to include an auxiliary rotor system, such as a tail rotor or propeller for example, are also contemplated herein. Further, although the dual main rotor assembly 14 is depicted as coaxial, embodiments including a dual rotor aircraft having non-coaxial rotors, are also within the scope of the disclosure.

Figure 3A:
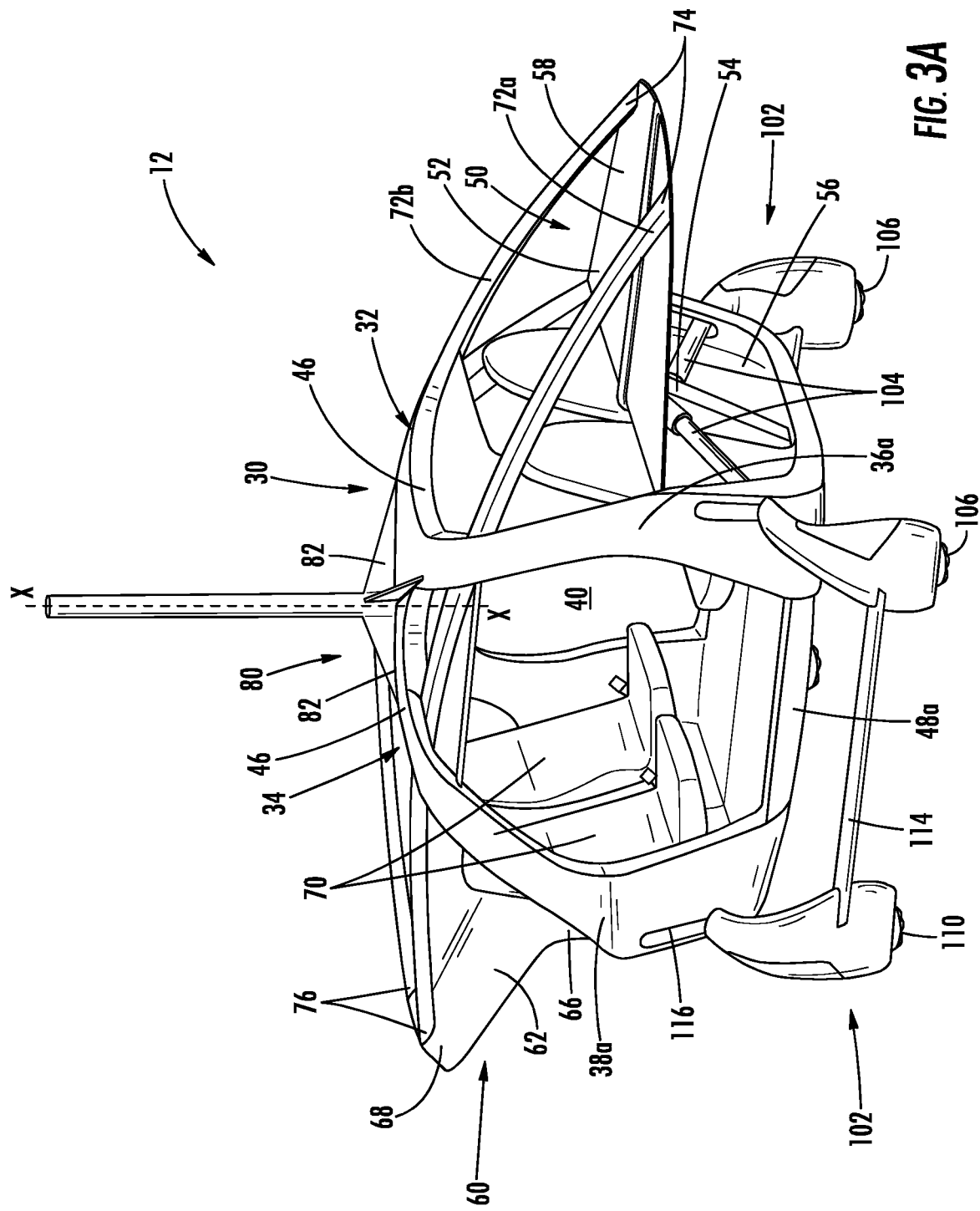
FIG. 3A is a perspective view of an airframe of the vertical takeoff and landing (VTOL) rotary wing aircraft according to an embodiment.

With reference now to FIGS. 3A-3C, an example of the airframe 12 or mechanical support structure of the aircraft 10 is illustrated in more detail. As shown, the airframe 12 includes primary structure 30 having a first or front frame 32 and a second or rear frame 34. In the illustrated, non-limiting embodiment, the front frame 32 and the rear frame 34 are disposed on opposing sides of the main rotor axis X of the main rotor assembly 14. Each of the front and rear frames 32, 34 includes a left frame member 36a, 36b and a right frame member 38a, 38b, respectively. The left and right frame member 36a, 36b, 38a, 38b of each of the front frame 32 and the rear frame 34 may be substantially identical and mirror image relative to one another. As shown, the left and right frame members 36a, 36b, 38a, 38b are spaced about the main rotor axis X. In the illustrated, non-limiting embodiment, the left frame members 36a, 36b of both the front and rear frames 32, 34 are disposed adjacent a first side of the main rotor axis X and the right frame members 38a, 38b of both the front and rear frames 32, 34 are arranged at a second, opposite side of the main rotor axis X.

Further, as a result of the spacing between the front and rear frames 32, 34, the left frame member 36a of the front frame 32 and the left frame member 36b of the rear frame 34 are separated from one another along a longitudinal axis L (see FIG. 1) of the aircraft 10. Similarly, the right frame member 38a of the front frame 32 and the right frame member 38b of the rear frame 34 are separated from one another along the longitudinal axis L of the aircraft 10.

Together, the left and right frame members 36a, 36b, 38a, 38b of the front frame 32 and the rear frame 34 cooperate to define a cabin 40 of the aircraft 10. The opening 42 formed between the left frame member 36a of the front frame 32 and the left frame member 36b of the rear frame 34, and the opening 42 formed between the right frame member 38a of the front frame 32 and the right frame member 38b of the rear frame 34 define doorways in the airframe 12 that provide access to the cabin 40.

In an embodiment, the left and right frame members 36a, 36b, 38a, 38b of each frame 32, 34 are integrally formed. For example, as best shown in FIG. 3C, a first connector 44 may extend between the bottom end of the frame members 36a, 38a, and 36b, 38b, respectively, to define a floor portion of the airframe 12. Alternatively, or in addition, a second connector 46 may extend between an upper end of the frame members 36a, 38a, and 36b, 38b, respectively, to define a ceiling portion of the airframe 12. Further, in an embodiment, the second connector 46 of the front frame 32 may abut the second connector 46 of the rear frame 34.

In an embodiment, the primary structure 30 of the airframe 12 additionally includes a lower longeron 48a, 48b extending between the left frame members 36a, 36b and the right frame members 38a, 38b of the front and rear frames 32, 34, respectively. Together, the front and rear frames 32, 34 and the lower longerons 48a, 48b define the structural support for one or more panels (not shown) that form the floor of the cabin 40 of the aircraft 10.

As shown, the airframe 12 may additionally include a first bulkhead 50 extending from the primary structure 30 in a first direction. The first bulkhead 50 has a body 52 and a structural rib 54 extending from a surface, such as the lower surface of the body 52 for example. In an embodiment, the body 52 includes a first portion 56 and a second portion 58 arranged at an angle to the first portion 56. In the illustrated, non-limiting embodiment, best shown in FIGS. 3A and 3B, the first portion 56 of the first bulkhead 50 is located between and affixed to the left and right frame members 36a, 38a of the front frame 32. The first portion 56 of the first bulkhead 50 may be oriented at an angle generally complementary or parallel to the adjacent portion of the left and right frame members 36a, 38a to maximize the space within the cabin 40. However, embodiments where the first portion 56 is non-parallel to the adjacent frame members 36a, 38a are also within the scope of the disclosure. The second portion 58 of the first bulkhead 50 extends outwardly from the primary structure 30 at an angle to the first portion 56 of the first bulkhead 50 and the frame members 36a, 38a of the front frame 32. In an embodiment, the second portion 58 of the first bulkhead 50 has a generally horizontal configuration when the aircraft 10 is grounded, parallel to the longitudinal axis L of the aircraft 10.

In an embodiment, a second bulkhead 60 is also connected to the primary structure 30 of the airframe 12. The second bulkhead 60 has a body 62 and a structural rib 64 extending from a lower surface of the body 62. Similar to the first bulkhead 50, the body 62 includes a first portion 66 and a second portion 68 arranged at an angle to the first portion 66. In the illustrated, non-limiting embodiment, best shown in FIG. 3C, the first portion 66 of the second bulkhead 60 is located between and affixed to the left and right frame members 36b, 38b of the rear frame 34. The first portion 66 of the second bulkhead 60 may, but need not be oriented at an angle generally complementary or parallel to the adjacent portions of the left and right frame members 36b, 38b to maximize the space within the cabin 40. As shown, the second portion 68 may extend from the primary structure 30 at a different angle than the second portion 58 of the first bulkhead 50. In an embodiment, the angle between the first portion 66 and the second portion 68 of the body 62 of the second bulkhead 60 is greater than 90 degrees.

A plurality of seats 70 are located within the portion of the primary structure 30 identified as the cabin 40. In an embodiment, one or more seats 70 may be integrated into one or both of the first bulkhead 50 and the second bulkhead 60. For example, as shown, two substantially identical seats 70 are mounted to the first portion 56, 66 of the body 52, 62 of each bulkhead 50, 60. In the illustrated, non-limiting embodiment, the seats 70 mounted to the first and second bulkheads 50, 60 have opposite orientations, such as that all of the seats 70 generally face inwardly towards the cabin 40. However, it should be understood that embodiments including one or more sideward facing seats or outward facing seats are also within the scope of the disclosure. In an embodiment, all of the seats positioned within the cabin 40 may be forward facing. Further, although two seats 70 are shown mounted to each bulkhead 50, 60, it should be understood that embodiments having any number of seats 70 are contemplated herein. For example, in an embodiment, three substantially identical seats 70 may be mounted to the second bulkhead 60.

The primary structure 30 of the airframe 12 additionally includes at least one upper longeron 72 extending between the first bulkhead 50 and the second bulkhead 60. In the illustrated embodiment, a first upper longeron 72a and a substantially identical second upper longeron 72b are mounted on opposing sides of the main rotor axis X. A first end 74 of each of the first and second upper longerons 72a, 72b is mounted to an upper surface of the second portion 58 of the first bulkhead 50 near a distal end thereof, and a second end 76 of each of the first and second upper longerons 72a, 72b is mounted to an upper surface of the second portion 68 of the second bulkhead 60 near a distal end thereof. As a result of the angle between the second portions 58, 68 of the bulkheads 50, 60, the upper longerons 72a, 72b have a generally arcuate contour. In an embodiment, the first and second upper longerons 72a, 72b in combination with a portion of the front and rear frames 32, 34 define the upper extent of the airframe 12 both fore and aft of the cabin 40. One or more panels may be mounted to the upper longerons 72a, 72b and the front and rear frames 32, 34 to define a ceiling of the cabin 40 of the aircraft 10.

In an embodiment, the primary structure 30, specifically the front and rear frames 32, 34 the lower longerons 48a, 48b, and the upper longerons 72a, 72b is substantially symmetrical about a vertical plane including both the main rotor axis X and the longitudinal axis L of the aircraft 10. However, embodiments where the primary structure 30 of the airframe is not symmetrical are also contemplated herein. Further, the primary structure 30 may be integrally formed as a single unitary composite body, formed from any suitable materials. In an embodiment, the front and rear frames 32, 34, the lower longerons 48a, 48b, and the upper longerons 72a, 72b are formed separately and then integrated to form a single structure, such as via a curing operation for example. Alternatively, the front and rear frames 32, 34, the lower longerons 48a, 48b, and the upper longerons 72a, 72b may be formed at the same time. However, any suitable method of manufacture of the airframe 12 is within the scope of the disclosure. The front and rear frames 32, 34 the lower longerons 48a, 48b, and the upper longerons 72a, 72b define a primary structure 30 having a spider-like configuration, referred to in the industry as a spider frame. For example, each end or side of the front and rear frames 32, 34, and the upper longerons 72a,72b may define a leg of the spider frame.

In an embodiment, the airframe 12 further includes a static mast 78 extending from the upper surface of the frames 32, 34 to define the main rotor axis X. As shown, a mounting structure 80 including a plurality of feet 82 is arranged concentrically about a portion of the static mast 78. In the illustrated, non-limiting embodiment, the mounting structure 80 includes four feet 82, and each foot 82 is supported by a left or right frame member 36a, 36b, 38a, 38b of the front or rear frames 32, 34. This connection between the static mast 78 of the main rotor assembly 14 and the primary structure 30 of the airframe 12 defines the load path from the main rotor assembly 14 to the airframe 12. Accordingly, the load and vibration of the main rotor assembly 14 is transmitted to and divided between the left frame member 36a of the front frame 32, the right frame member 38a of the front frame 32, the left frame member 36b of the rear frame 34 and the right frame member 38b of the rear frame 34. It should be understood that although a mounting structure 80 having four feet 82 is illustrated and described herein, the mounting structure 80 may have any suitable number of feet 82 to evenly distribute the load to each frame member of the primary structure 30.

To form a fuselage of the aircraft 10, an outer skin 84, best shown in FIGS. 1A-1C, is attached to the various portions of the airframe 12. In an embodiment, one or more portions of the outer skin 84 include a window 86, for example extending between structural portions of the airframe 12, such as between the first and second upper longeron 78a, 78b for example. As best shown in FIG. 4, with the skin 84 attached to the airframe 12, a first, fore storage compartment 88 of the aircraft 10 is defined between a bottom of the first bulkhead 50 and the skin 84, and a second, aft storage compartment 90 of the aircraft 10 is defined between a bottom surface of the second bulkhead 60 and the skin 84.

With continued reference again to FIGS. 3A-3C and FIGS. 4A-4C, a landing gear system 100 is connected to the airframe 12 of the aircraft 10. As shown, the landing gear system 100 of the aircraft 10 includes a first and second landing gear assembly 102 affixed to the airframe 12 at opposing sides of the aircraft 10. In the illustrated, non-limiting embodiment, each landing gear assembly 102 includes a first landing gear support 104 having at least one first landing surface 106 and a second landing gear support 108 having at least one second landing surface 110. Accordingly, as illustrated and described herein, the landing gear system 102 is a quad landing gear. However, it should be understood that embodiments including a different number of landing gear assemblies 102, or a landing gear assembly having a different configuration are also within the scope of the disclosure.

The landing surface 106, 110 of each landing gear support 104, 108 may be defined by a ground contact member 112 connected to each of the landing gear supports 104, 108, respectively. As best shown in in FIG. 4B, the ground contact member 112 may be a wheel, or alternatively, a member having a plurality of aligned or coaxial wheels. However, embodiments where the ground contact member 112 is a skid or other element having a planar surface are also within the scope of the disclosure. A connecting member 114 may extend between the first landing gear support 104 and the second landing gear support 108. In an embodiment, the connecting member 114 is mounted to the first landing gear support 104 and the second landing gear support 108 at a position vertically below the cabin 40 of the aircraft 10 to provide a support or step for passengers entering into or exiting from the cabin 40.

The landing gear assembly 102 is configured to transition between various positions relative to the airframe 12 including an extended position and a compressed position. The extended and compressed positions of the landing gear assembly 102 will vary based on the landing forces that the landing gear assembly 102 is designed to withstand. It should be understood that the landing gear assembly 102 is free to move between the extended position and the compressed position as a result of the forces applied by the ground.

The ground contact member 112 of each landing gear support 104, 108 is operably coupled to a primary energy attenuation device 115. In the illustrated, non-limiting embodiment, the primary energy attenuation device 115 is a suspension or a biasing member, for example a spring. Accordingly, in response to application of a force to the ground contact member 112, such as upon engaging the ground, the biasing member 115 will deform in a direction opposing a bias force of the biasing member. In an embodiment, each ground contact member 112 is further operably coupled to a secondary energy attenuation device 116. The first energy attenuation device 115 and the secondary energy device 116 may be configured in series such that the secondary energy attenuation device 116 is configured to absorb energy only when the force applied to the ground contact member 112 exceeds the energy attenuation capabilities of the primary energy attenuation device 115, i.e. the spring is fully compressed. In other embodiments, the primary and secondary energy attenuation devices 115, 116 may be operated in parallel.

Figure 4A:
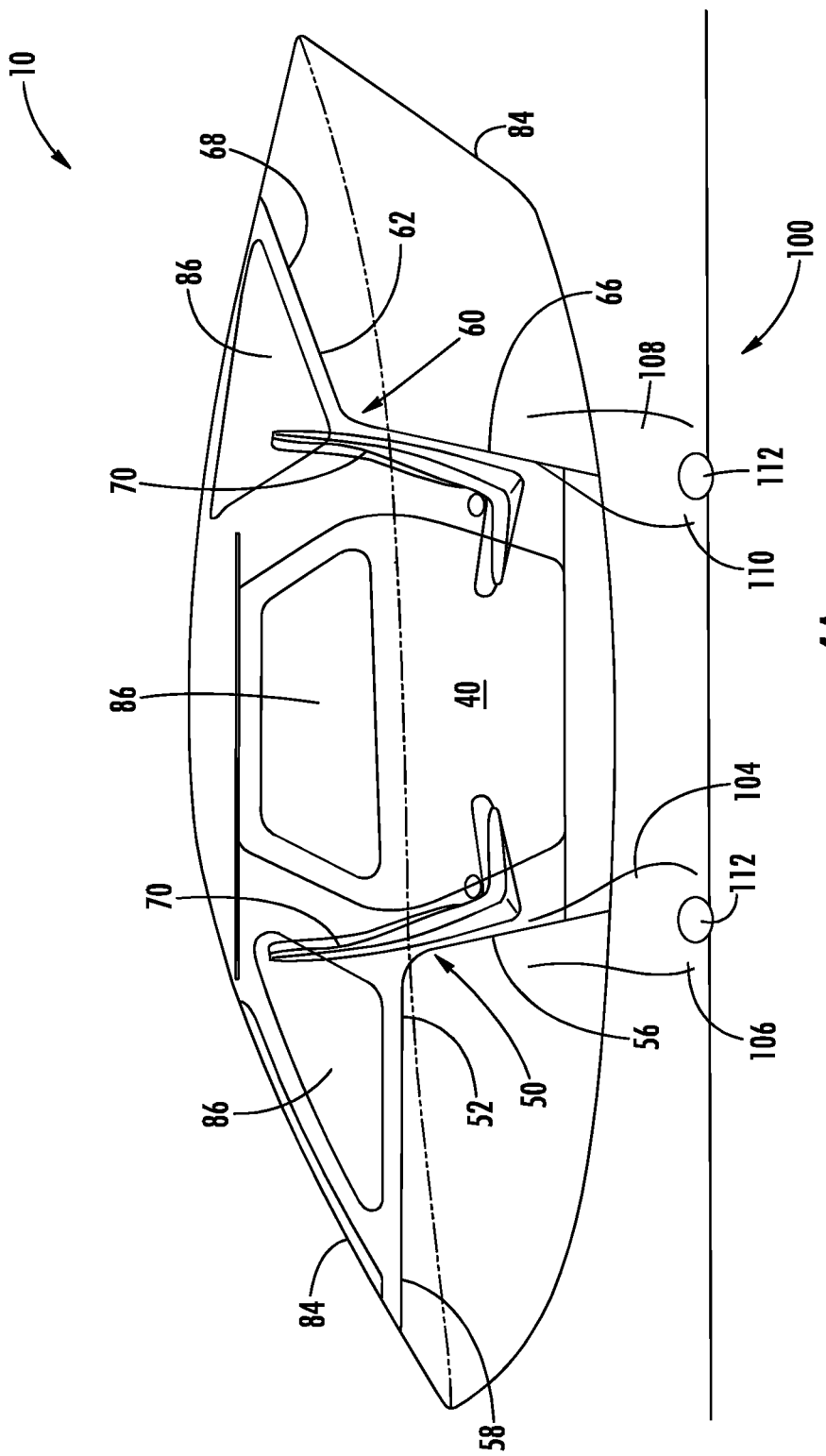
FIGS. 4A, 4B, 4C, and 4D are various views of a landing gear system of a vertical takeoff and landing (VTOL) rotary wing aircraft according to an embodiment.
Figure 4B:
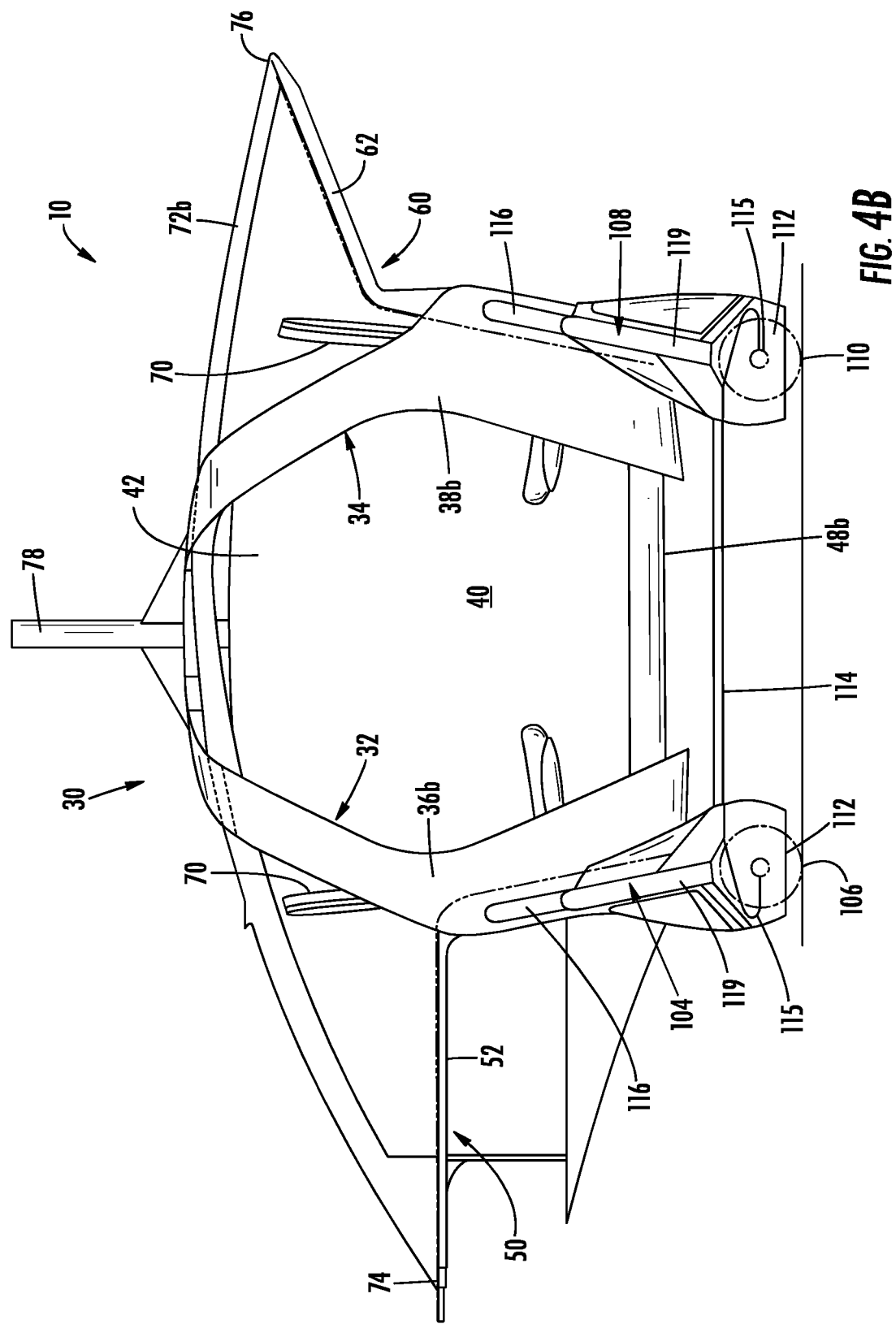
Figure 4C:
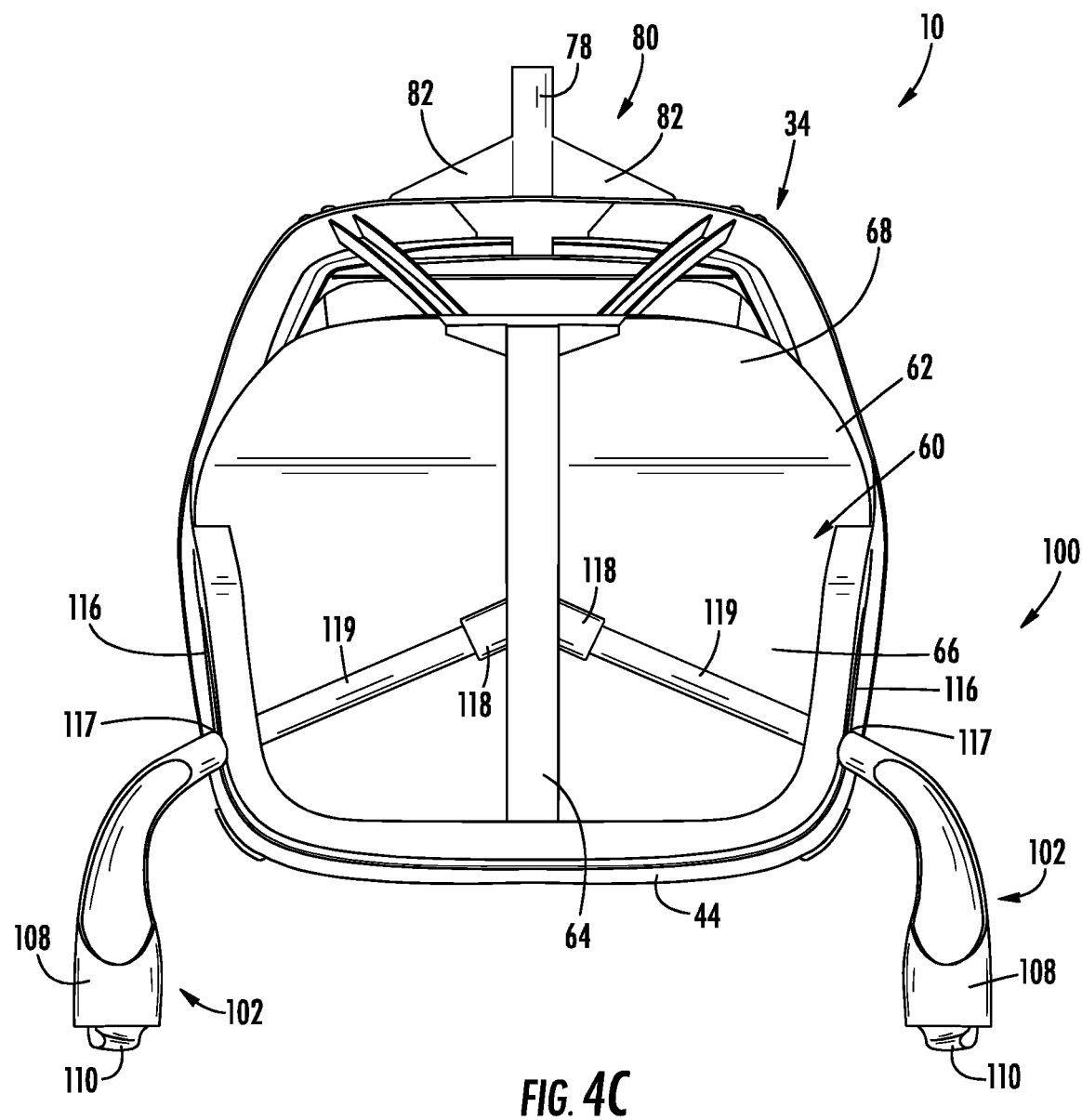
Figure 4D:
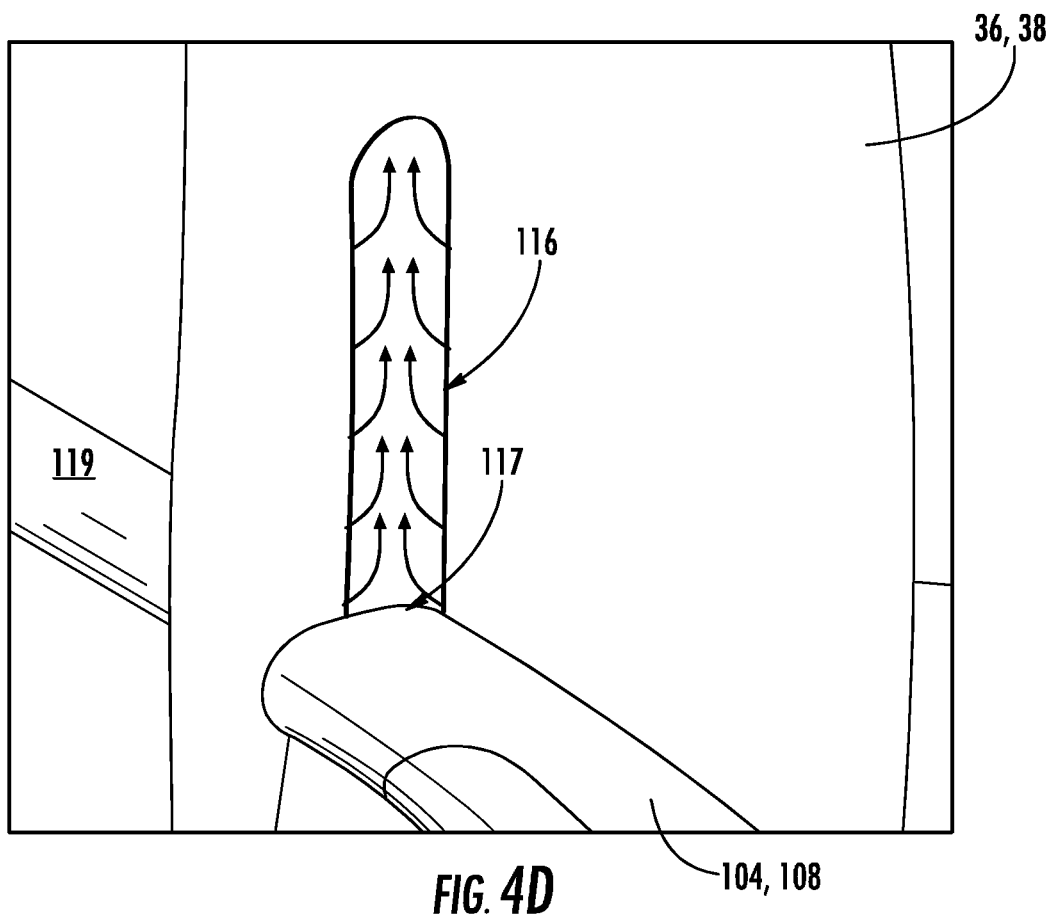

In an embodiment, the second energy attenuation device 116 is a structural fuse, for example formed in a portion of the primary structure 30. As best shown in FIG. 4C, each landing gear support 104, 108 includes a strut 119 having a first end coupled to a ground contact member 112 and and a second end 118 connected to a rib 54, 64 extending from a bottom surface of an adjacent bulkhead 50, 60. In an embodiment, the interface between the second end 118 of the strut 119 and the rib 54, 64 may be a splined connection to prevent rotations of the strut 119 relative to the primary structure 30. As mounted, each strut 119 extends through a respective structural fuse 116. Accordingly, a portion of the strut, indicated at 117, is positioned within the structural fuse 116.

Each structural fuse 116 is independently mounted within the aircraft 10. The structural fuses 116 are configured to fail and absorb energy through a shearing action. In the event of a hard landing where the forces exceed an allowable threshold or set point of the secondary attenuation device 116, or the combination of the primary and secondary energy attenuation devices 115, 116, the excess forces transferred to the structural fuse 116 will cause the structural fuse 116 to shear from the bulkhead 50, 60 allowing the strut 119 of the landing landing gear support 104, 108 to stroke through the length of the fuse 116 and attenuate the landing forces. As the stroking of the strut 119 occurs, the strut 119 is configured to yield in bending at the second end 118 adjacent the rib 54, 64. Because each of the structural fuses 116 is a sacrificial component and is mounted redundantly to the primary structure 30, a broken structural fuse 116 and landing gear assembly 102 can be easily replaced within the aircraft 10, without having incurred major structural damage. Although specific energy attenuation devices are illustrate and described herein, it should be understood that any suitable energy attenuation component, for example a shock strut having one or more fluids (e.g. oil or nitrogen) or an electromechanical support configured to attenuate energy and produce damping forces in response to a force is also within the scope of the disclosure.

Figure 5:
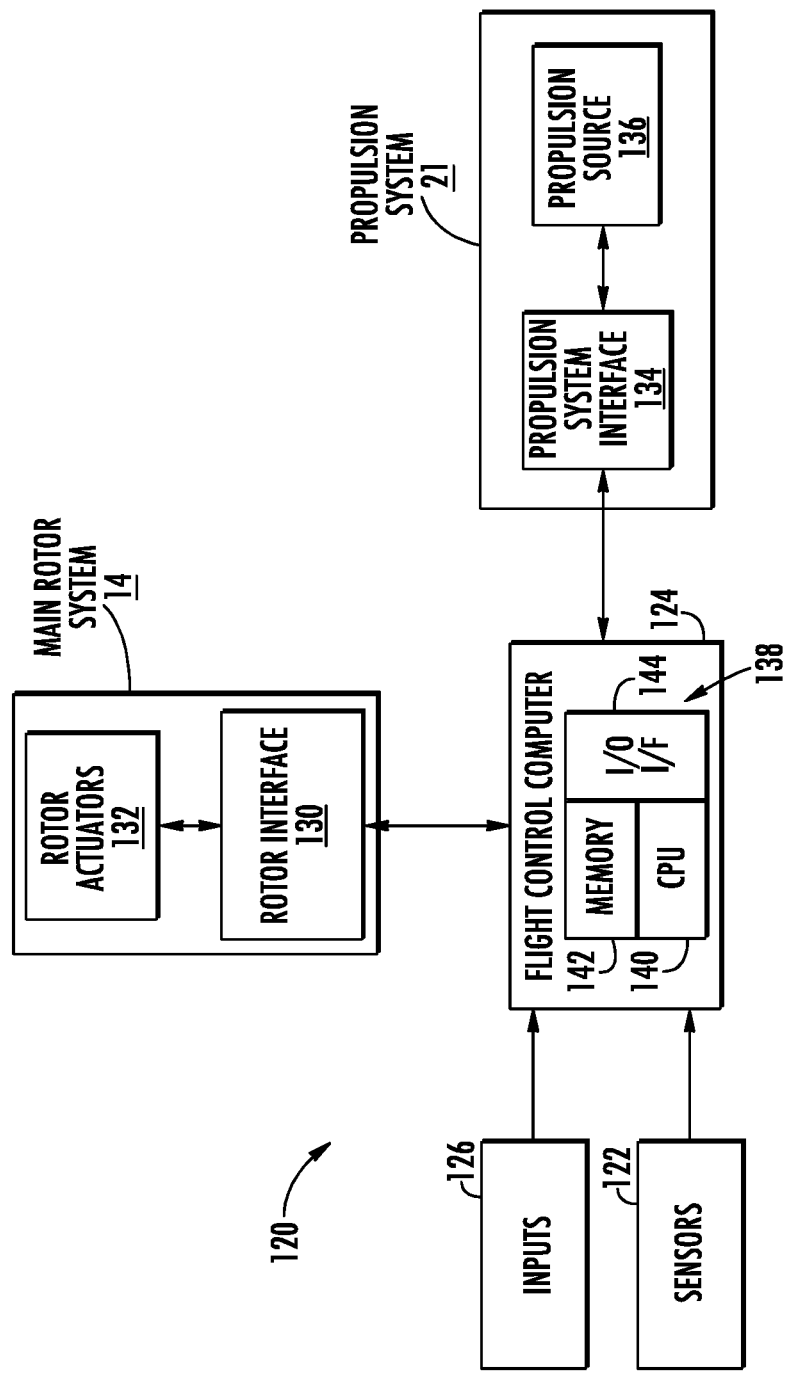
FIG. 5 is a schematic diagram of a flight control system of a vertical takeoff and landing (VTOL) rotary wing aircraft according to an embodiment.

With reference now to FIG. 5, a schematic diagram of a flight control system 120 operable to control various portions of the aircraft 10 is illustrated. In an embodiment, the flight control system 120 is a fly-by-wire (FBW) control system. In a FBW control system 120 there is no direct mechanical coupling between a pilot's controls and movable components of aircraft 10. Instead of using mechanical linkages, a FBW control system 120 includes a plurality of sensors 122 which can sense the position of controlled elements and generate electrical signals proportional to the sensed position. The sensors 122 may also be used directly and indirectly to provide a variety of aircraft state data to a flight control computer (FCC) 124.

In an embodiment, the aircraft 10 is an autonomous rotary wing aerial vehicle (UAV) capable of taking off, flying, landing, and completing one or more missions without human interference. In such embodiments, passengers may be located within the cabin 40 of the aircraft 10, but are not able to control operation of the aircraft 10. In other embodiments, the aircraft 10 may be semi-autonomous, such that a human operator may perform a portion, but not all of the tasks associated with operation of the aircraft, or may be fully operated by a pilot. In embodiments where the aircraft 10 is semi-autonomous, the human operator may be a passenger of the aircraft 10, or alternatively, may be located remotely from the aircraft 10.

The FCC 124 is configured to receive inputs 126 as control commands from various sources. For instance, the inputs 126 can be pilot inputs, auto-pilot inputs, navigation system based inputs, or any control inputs from one or more control loops executed by the FCC 124 or other subsystems. In response to information provided by the sensors 122 and inputs 126, the FCC 124 transmits signals to various subsystems of the aircraft 10.

The flight control system 120 may include a rotor interface 130 associated with the main rotor assembly 14 of the aircraft 10. The rotor interface 130 is configured to receive commands from the FCC 124 and control one or more actuators 132, such as mechanical-hydraulic or electric actuators, for the upper rotor assembly 18 and lower rotor assembly 20. In an embodiment, inputs including cyclic, collective, pitch rate, and throttle commands that may result in the rotor interface 130 driving the one or more actuators 132 to adjust upper and lower swashplate assemblies (not depicted) for pitch control of the upper rotor assembly 18 and lower rotor assembly 20. Alternatively, pitch control can be performed without a swashplate assemblies using individual blade control (IBC) in the upper rotor assembly 18 and lower rotor assembly 20. In such embodiments, the rotor interface 130 can manipulate the actuators 132 associated with the upper rotor assembly 18 and the lower rotor assembly 20 independently. This allows different collective and cyclic commands to be provided to the upper rotor assembly 18 and lower rotor assembly 20.

As shown, flight control system 120 may additionally include a propulsion system interface 134 associated with the propulsion system 21 of the aircraft 10. The propulsion system interface 134 is configured to receive commands from the FCC 124 to control one or more propulsion sources 136 of the aircraft 10, such as an electric motor or engine for example, to be described in more detail below. In an embodiment, inputs 126 include a throttle command to adjust the rotational speed of the propulsion source 136. The FCC 124 may also send commands to propulsion system interface 134 to control the propulsion source 136 in certain predefined operating modes.

The FCC 124 includes a processing system 138 that applies models and control laws to augment commands based on aircraft state data. The processing system 138 includes processing circuitry 140, memory 142, and an input/output (I/O) interface 144. The processing circuitry may be any type or combination of computer processors, such as a microprocessor, microcontroller, digital signal processor, application specific integrated circuit, programmable logic device, and/or field programmable gate array, and is generally referred to as central processing unit (CPU) 140. The memory 142 can include volatile and non-volatile memory, such as random access memory (RAM), read only memory (ROM), or other electronic, optical, magnetic, or any other computer readable storage medium onto which data and control logic as described herein are stored. Therefore, the memory 142 is a tangible storage medium where instructions executable by the processing circuitry are embodied in a non-transitory form. The I/O interface 144 can include a variety of input interfaces, output interfaces, communication interfaces and support circuitry to acquire data from the sensors 122, inputs 126, and other sources (not depicted) and communicate with the rotor interface 130, the propulsion system interface 134, and other subsystems (not depicted).

In operation, the flight control computer FCC 124 receives one or more inputs 126, such as via cyclic, collective, pedals or any other suitable interface, and data from one or more aircraft sensors 122. In response to receiving the inputs 126 and sensor data 122, the FCC 124 determines various flight control commands to be applied at the aircraft 10 in order to implement the inputs 126. For example, by applying one or more flight control laws, the FCC 124 can determine flight commands for the main rotor assembly 14 of the aircraft 10. The flight commands for the main rotor assembly 14 include, but are not limited to, pitch, roll and yaw of the upper and lower rotors 18, 20 as well as collective commands, for example.

In an embodiment, the propulsion system interface 134 receives the main rotor flight commands from the FCC 124 and determines commands, such as torque and/or rotor speed for example, for implementing the main rotor flight commands at the aircraft 10. The determined torque and rotor speed commands are then implemented at the one or more propulsion sources 136 operably coupled to the upper and lower rotors 18, 20 of the main rotor assembly 14. In an embodiment, at least one propulsion source 136 may be configured to provide feedback to the FCC 124 or another component of the propulsion system 21 to regulate operation thereof.

In embodiments where the aircraft 10 includes an auxiliary rotor system, the FCC 124 may additionally include an auxiliary rotor interface associated with one or more actuators of the auxiliary rotor. In such embodiments, the FCC 124 will similarly apply flight control laws to determine flight commands for the auxiliary rotor system, such as propeller thrust commands for example. The flight commands determined by the FCC 124 are then communicated to auxiliary rotor interface (not shown) and/or the propulsion system interface 136.

Figure 6:
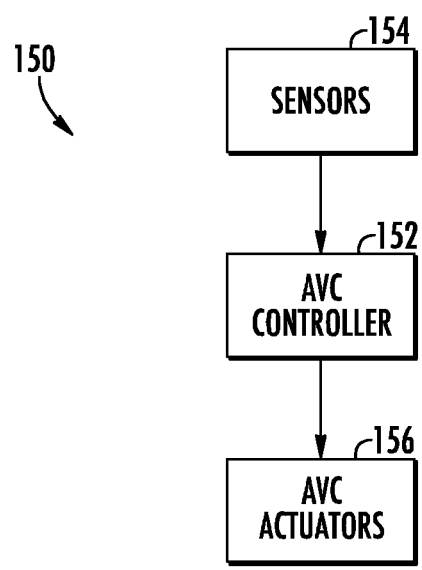
FIG. 6 is a schematic diagram of an active vibration of a vertical takeoff and landing (VTOL) rotary wing aircraft according to an embodiment.

In an embodiment, the aircraft 10 may employ an active vibration control (AVC) system 150 to reduce vibration in the airframe 12. FIG. 6 depicts an example of an AVC system 150. An AVC controller 152 is operable to execute an AVC control process to reduce vibration in the aircraft 10. The AVC controller 152 may be implemented as part of the flight control system 120, executed by the FCC 124, or may be a separate controller. One or more sensors 154 are located about the aircraft 10 to detect vibration. Sensors 154 may be located in a wide variety of positions, including the airframe 12, on the main rotor assembly 14, etc. It should be understood that these locations are intended as an example only and the AVC sensors 154 may be located at any suitable position. The system 150 additionally includes one or more AVC actuators 156 operable to generate a force to dampen vibration in the aircraft 10. The AVC actuators 156 may similarly be located at any position about the aircraft 10.

In operation, the AVC controller 152 receives vibration signals from the AVC sensors 154. AVC controller 154 provides control signals to the AVC actuators 156 to generate forces to reduce the vibration sensed by the AVC sensors 154. The control signals provided to the AVC actuators 156 may vary in magnitude and frequency to cancel vibrations in the aircraft 10. In an embodiment, the AVC controller 154 operates in a feedback mode, where the control signals provided to AVC actuators 156 are adjusted in response to the vibration measured from the AVC sensors 154.

Figure 7:
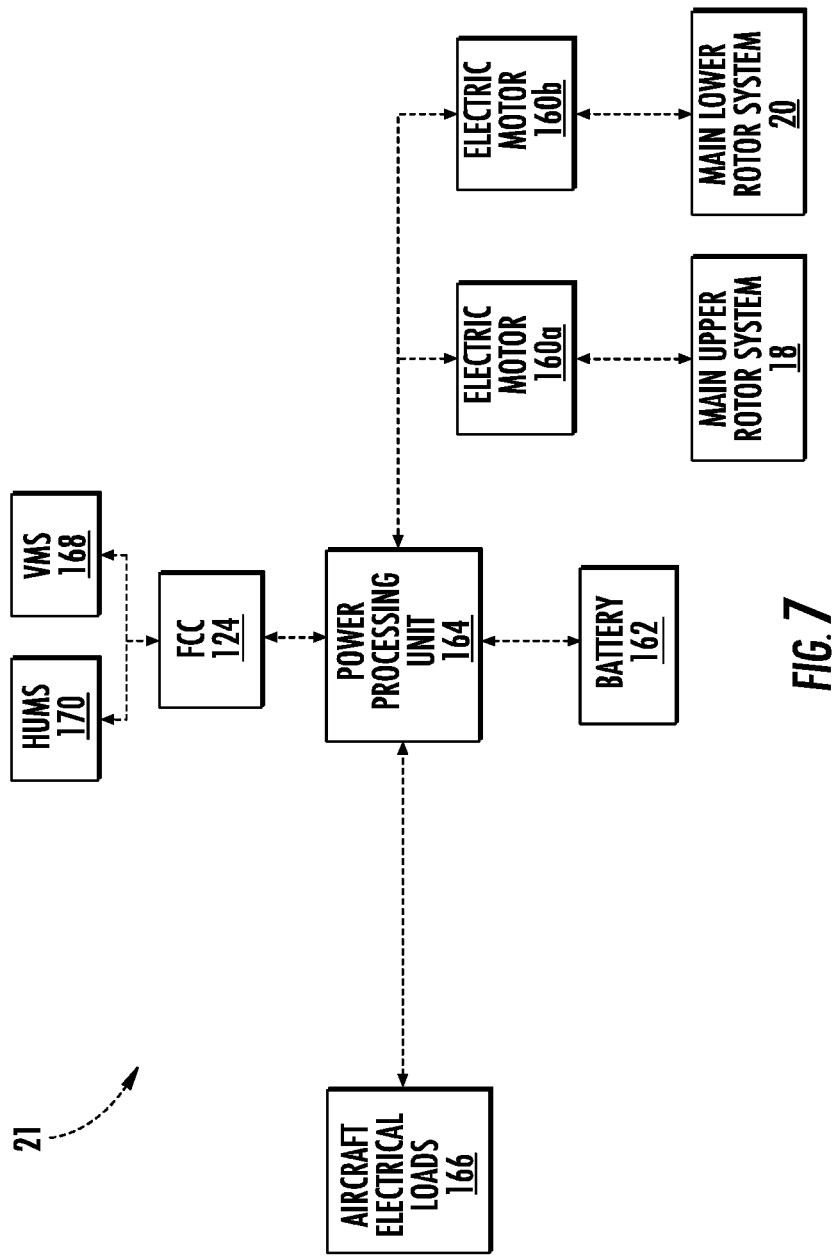
FIG. 7 is a schematic diagram of a propulsion system of a vertical takeoff and landing (VTOL) rotary wing aircraft according to an embodiment.

With reference now to FIG. 7, a schematic diagram of the propulsion system 21 of the aircraft 10 is illustrated in more detail. The propulsion system 21 is configured to drive the main rotor assembly 14 using power provided by one or more electric motors 160 during at least one mode of operation. Although the aircraft 10 is illustrated as having only a main rotor assembly, in embodiments where the aircraft is adapted to include an auxiliary rotor system, such as a tail rotor or propeller for example, the propulsion system 21 may be similarly controlled to drive the auxiliary rotor system about an axis of rotation. As shown, each of the upper and lower rotor assemblies 18, 20 of the main rotor assembly 14 are mechanically connected to an electric motor 160. In an embodiment, to be described in more detail below, the upper rotor assembly 18 is driven by a first electric motor 160*a* and the lower rotor assembly 20 is driven by a second electric motor 160*b*. However, embodiments where power from a single electric motor is used to rotate both the upper and lower rotor assemblies 18, 20 are also within the scope of the disclosure. When electricity is delivered to the electric motors 160*a*, 160*b*, the upper or lower rotor assembly 18, 20 associated with the electric motor 160*a*, 160*b* is rotated about the main rotor axis of rotation X. Electricity may additionally be used to power electrical and mechanical flight controls such as, for example, individual blade control (IBC) servos, hydraulic actuators, aircraft power, etc, identified as actuators 132 in FIG. 5.

Figure 8:
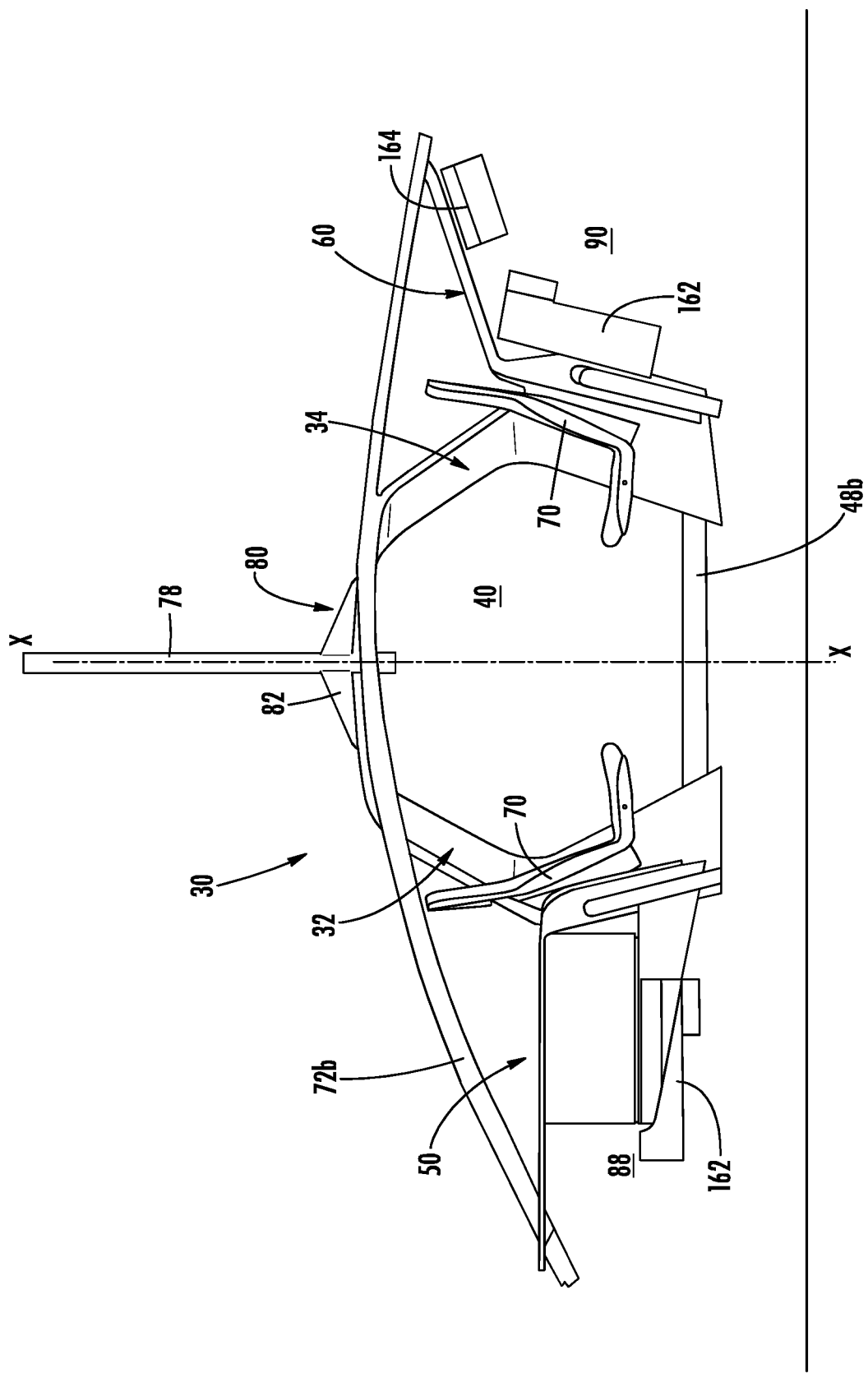
FIG. 8 is a schematic diagram of a portion of a propulsion system of FIG. 7 according to an embodiment.

With continued reference to FIG. 7, and further reference to FIG. 8, the propulsion system 21 includes an energy storage system including at least one energy storage device 162, such as a battery mounted within the fore compartment 88 defined by the first bulkhead 50. As shown, the energy storage system additionally includes at least one battery 162 mounted within the aft compartment 90 of the aircraft 10 defined by the second bulkhead 60. The at least one battery 162 positioned in either the fore or the aft compartment 88, 90 may be suspended from the bulkhead 50, 60 in a manner that not only provides a mechanic easy access to the at least one battery, but also allows the at least one battery 162 to be easily removed and/or replaced. The propulsion system 21 of the aircraft 10 illustrated in FIG. 7, does not include an internal combustion engine. In such embodiments, the aircraft 10 is operated solely using electrical power stored within the batteries 162 or generated when the aircraft 10 is in flight. It should be understood that the term battery 162 as used herein may refer to an individual battery or alternatively, to a battery bank or battery pack containing a plurality of batteries capable of storing electrical energy. A battery bank having any suitable number of batteries based on the configuration of the aircraft 10 and one or more operational parameters thereof is within the scope of the disclosure. The energy storage system may be responsible for up to, or even more than, about 30% of the weight of the aircraft 10 when unoccupied. In an embodiment, the primary structure 30, and specifically the front and rear frames are designed to support the energy storage system in a structurally efficient manner.

The propulsion system 21 additionally includes a power processing unit 164 that is electrically connected to the one or more batteries 162, the one or more electric motors 160a, 160b of the main rotor assembly 14, and one or more other aircraft electrical loads, illustrated schematically at 166. The power processing unit 164 is operable to distribute electricity from the one or more batteries 162 to the various needs of the aircraft 10, for example, to the aircraft electrical load 166, and to the electric motors 160a, 160b which drive the upper and lower rotor assemblies 18, 20 of the main rotor assembly 14. The power processing unit 164 is additionally coupled to the FCC 124 of the flight control system 120. The FCC 124 receives commands, such as from pilot inputs and from other aircraft electric loads for example, to provide power to the motors 160a, 160b or other actuators 132 of the aircraft 10. In response to these commands, the FCC 124 will send a signal to the power processing unit 164 to distribute electricity accordingly. In an embodiment, the FCC 124 may include or be arranged in communication with a vehicle management system (VMS) 168 and/or a health and usage monitoring system (HUMS) 170. The HUMS 170 collects operational flight data utilizing onboard accelerometers, sensor, and other avionics systems. The HUMS 170 uses this collected information not only to monitor the health of components of the aircraft 10 in real time, but also to perform predictive analytics. For example, the HUMS 170 may be operable to predict when one or more component of the aircraft will require maintenance and/or replacement.

Figure 9:
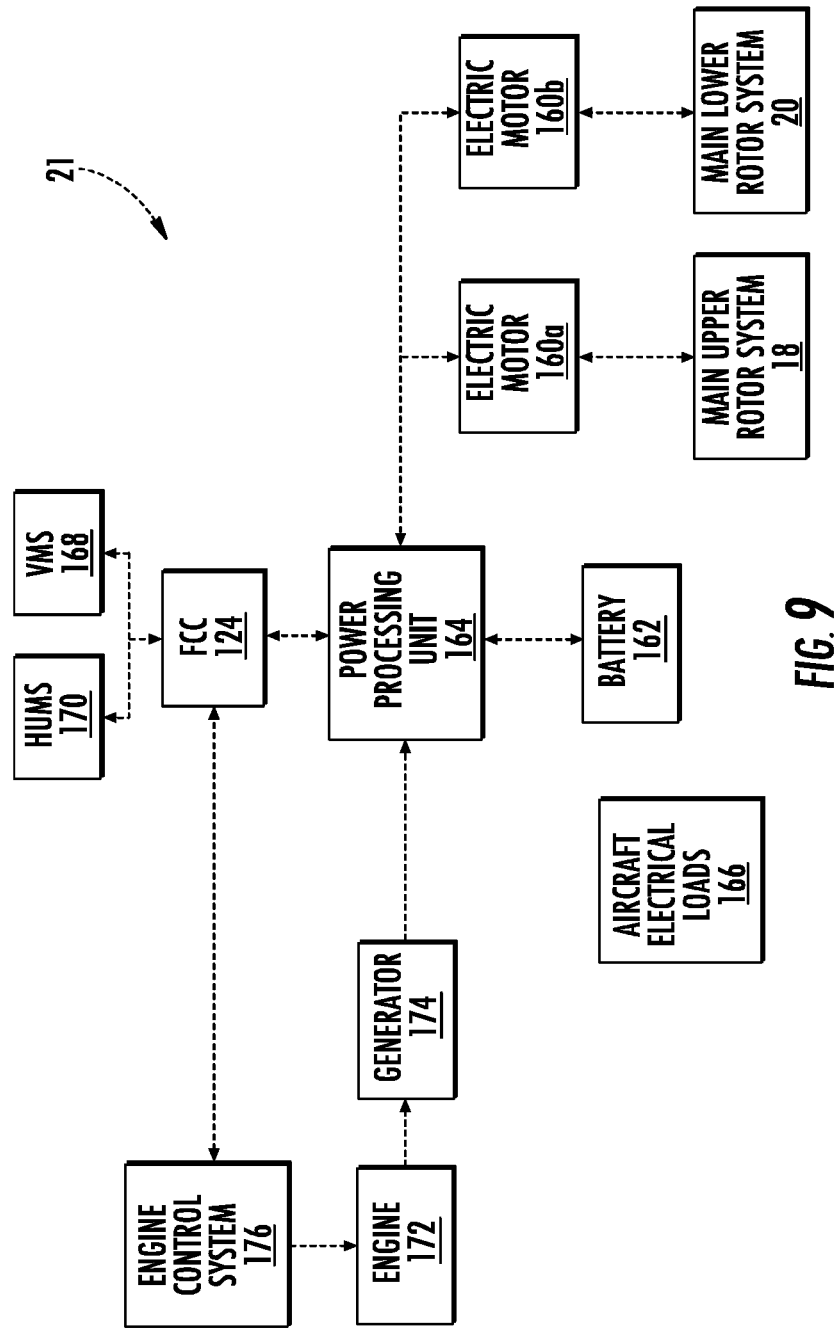
FIG. 9 is a schematic diagram of another propulsion system of a vertical takeoff and landing (VTOL) rotary wing aircraft according to an embodiment.
Figure 10:
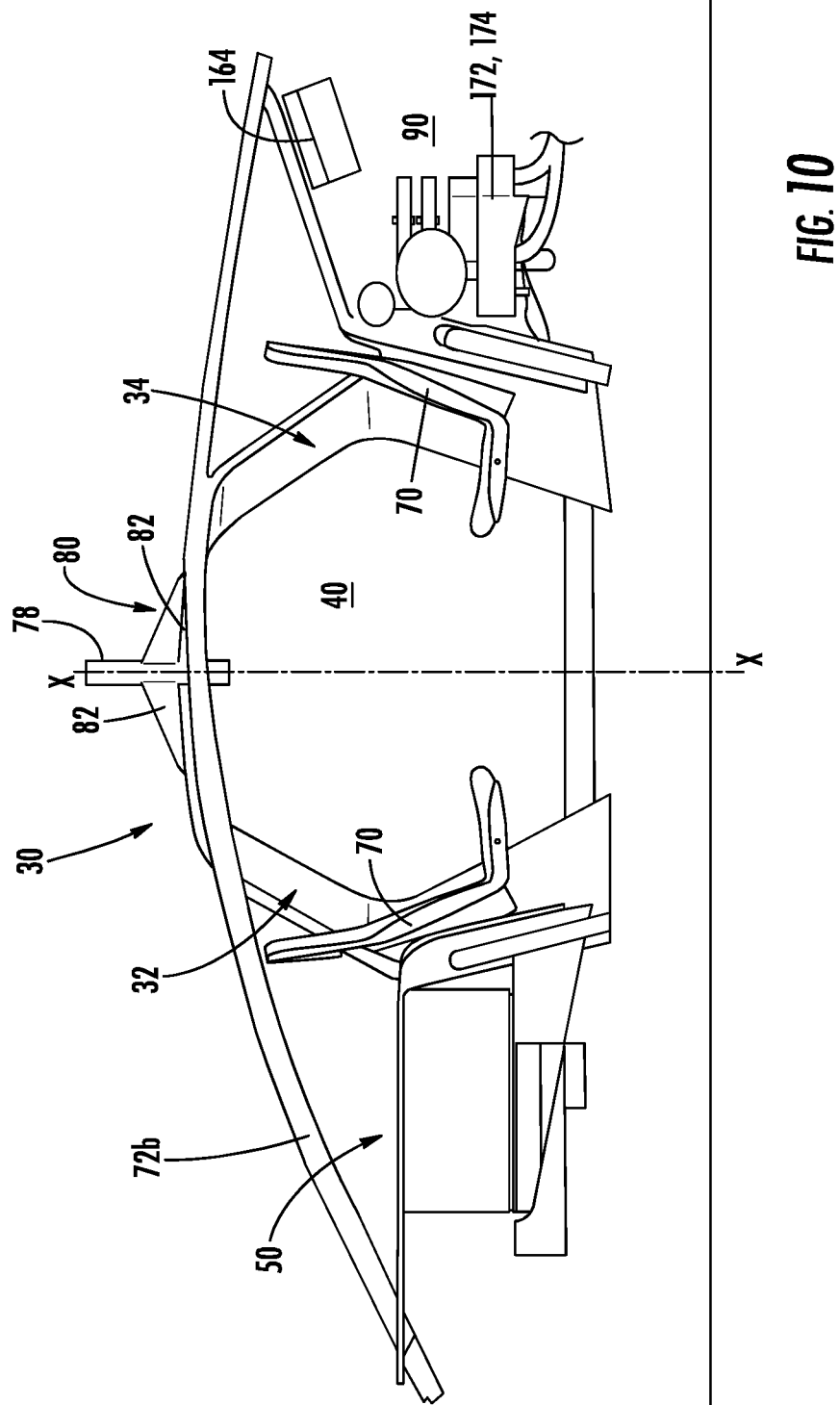
FIG. 10 is a schematic diagram of a portion of the propulsion system of FIG. 9 according to an embodiment.
Figure 11:
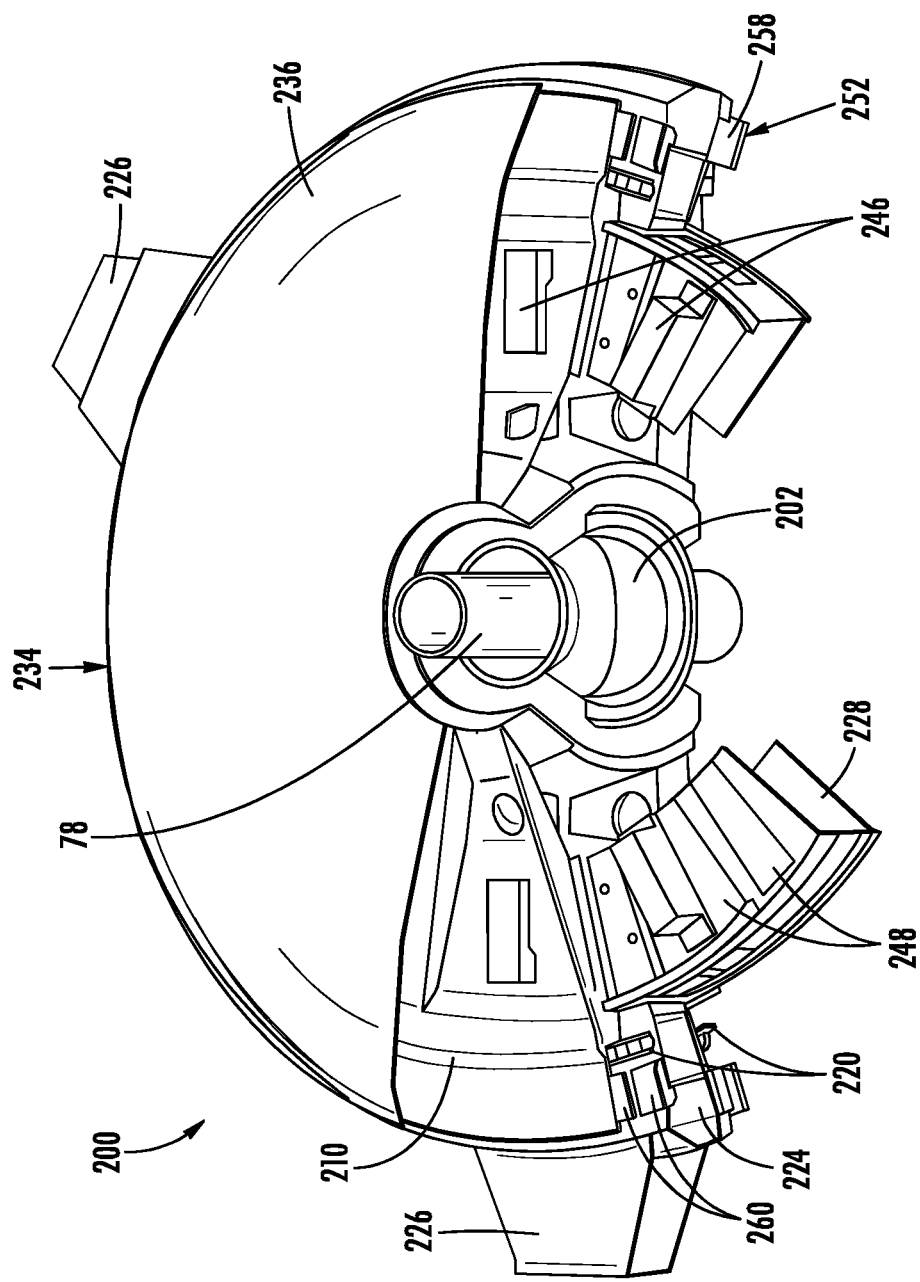
FIG. 11 is a perspective view of a propulsion system according to an embodiment.
Figure 12:
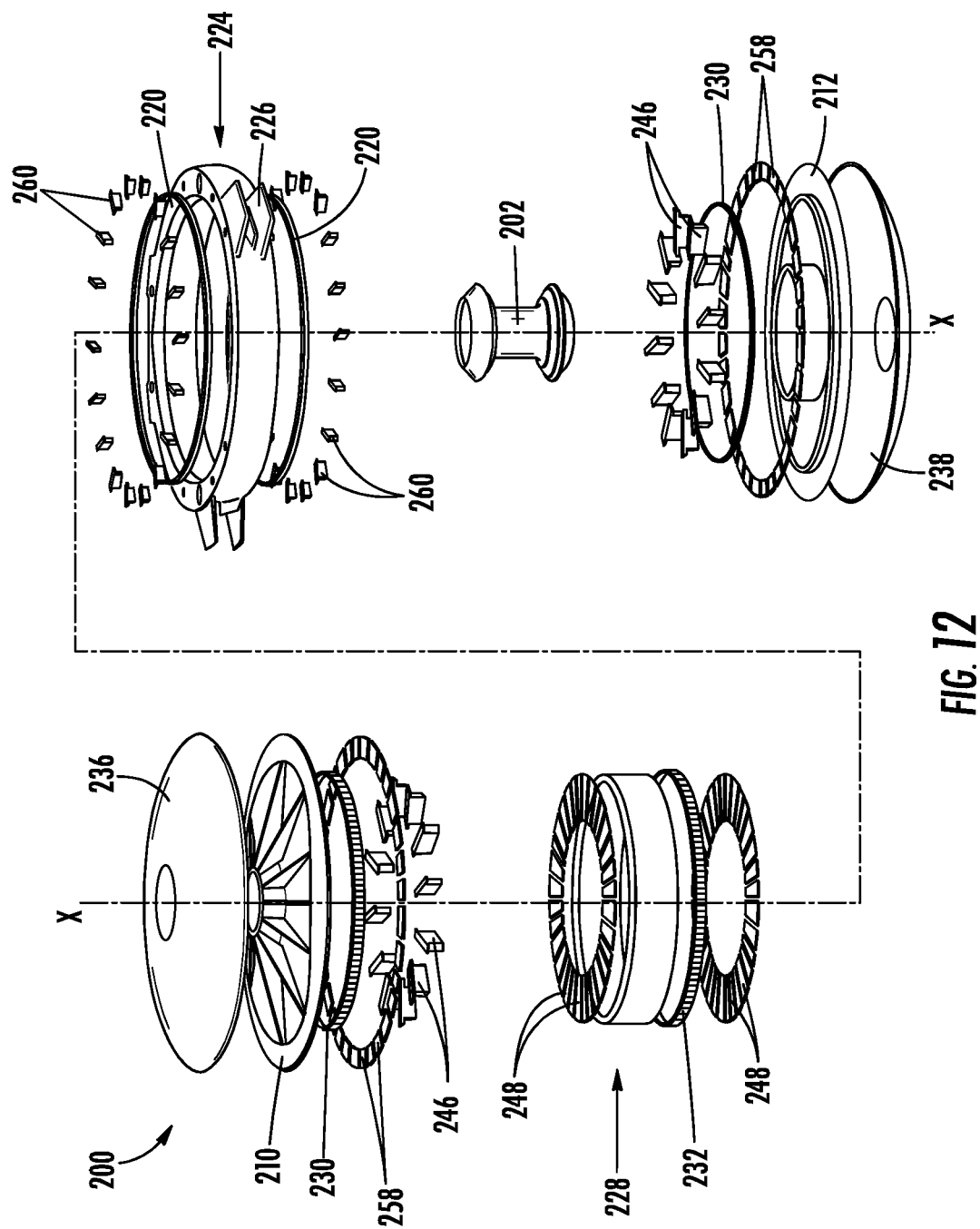
FIG. 12 is an exploded view of the propulsion system of FIG. 11 according to an embodiment.

With reference now to FIGS. 9 and 10, another embodiment of the propulsion system 21 of the aircraft 10 is illustrated. In the illustrated, non-limiting embodiment, the propulsion system 21 is a hybrid system having both a battery 162 and an engine for providing power to one or more loads of the aircraft. As shown, an engine 172 and a corresponding generator 174 may be mounted within the aft compartment 90 of the aircraft 10, in place of one or more previously described batteries 162. The engine 172 may be a turbine engine, a spark ignition engine, or a compression ignition engine. Although a single engine is illustrated, it should be understood that embodiments including additional engines are also within the scope of the disclosure. The mechanical energy generated by operation of the engine 172 is converted into electrical energy by a generator 174 coupled to the engine 172. The FCC 124 is arranged in communication with an engine control system 176. The FCC is configured to receive commands from the inputs 126 to provide electric power to the motors 160a, 160b, and will therefore send commands to the engine control system 176 to provide power and to the power processing unit 164 to distribute electricity.

In embodiments of the propulsion system 21 that include an engine 172, the power processing unit 164 receives power from the generator 174 coupled to the engine 172, and distributes that power to the various demands of the aircraft 10. The electricity stored within the batteries 162 may be used to supplement high-power demand of the aircraft 10 such as, for example, during take-off, landing, climbing, descent, emergency power conditions, or transient or maneuvering power, etc. In this way, the electric motors 160a, 160b supplement power from the internal combustion engine 172 by using additional energy stored in the battery bank 162, thereby allowing the size of the engine 172 to be reduced.

The power processing unit may be operable in a manner as described in U.S. Pat. No. 10,131,442, the entire contents of which are incorporated herein by reference. For example, in embodiments where the various electrical demands of the aircraft 10 exceed the electricity being produced by the generator 174, the power processing unit 164 will distribute power from the batteries 162 to one or more electrical demands of the aircraft 10. Similarly, the power processing unit 164 distributes electricity to the battery bank 162 for storage (i.e. recharge the battery) when the demand for electricity by the aircraft electrical loads 166 and the electric motors 160a, 160b is less than the electricity being produced by the generator 174. Through such operation, the distribution of electricity by the power processing unit 164 may enable the FCC 124 to smooth out the load on the engine 172 due to the power requirement of the main rotor assembly 14 and the aircraft electric loads 166. This smoothing out of the load on the engine 172 may allow the engine 172 to operate more efficiently, and may reduce the noise generated by the engine 172. As described herein, in embodiments of the aircraft 10 including an engine 172, the engine 172 is provided as the primary power source of the aircraft 10. However, it should be understood that embodiments of the propulsion system 21 where power is provided by both the engine 172 and battery 162 regardless of whether the power demand exceeds the power generated by the engine 172 are also within the scope of the disclosure.

With reference again to FIG. 5, the rotor interface 130, under control of the FCC 124, can control the upper rotor assembly 18 and lower rotor assembly 20 to pitch the rotor blades in different magnitudes and/or different directions at the same time. This includes differential collective, where the upper rotor assembly 18 has a collective pitch different than the collective pitch of the lower rotor assembly 20, in magnitude and/or direction. Differential pitch control also includes differential cyclic pitch control, where the upper rotor assembly 18 has a cyclic pitch different than the cyclic pitch of the lower rotor assembly 20, in magnitude, axis of orientation (e.g., longitudinal or lateral) and/or direction. The differential collective and the differential cyclic pitch control may be accomplished using independently controlled swashplates in the upper rotor assembly 18 and lower rotor assembly 20. Alternatively, differential collective and the differential cyclic pitch control may be accomplished using individual blade control in the upper rotor assembly 18 and lower rotor assembly 20, as previously described herein.

The ability to independently control the pitch of the upper rotor assembly 18 and the lower rotor assembly 20 allows the lower rotor assembly 20 to be adjusted in a manner that addresses its position beneath the upper rotor assembly 18. For example, the lower rotor assembly 20 is located in the downwash of the upper rotor assembly 18. To accommodate for this, the lower rotor assembly 20 may have a collective pitch that differs from the collective pitch of the upper rotor assembly 18.

In addition, because a separate electric motor 160a, 160b is associated with each of the upper rotor assembly 18 and the lower rotor assembly 20 of the main rotor assembly 14, the motors 160a, 160b may be controlled over a wide range of speeds in response to the FCC 124 of the flight control system 120. The use of independently controlled upper rotor assembly 18 and the lower rotor assembly 20 along with other control surfaces, provides the ability to control yaw using a variety of elements. For example, in a first mode of operation, such as when the aircraft is travelling below a first speed, the FCC 124 may use a differential collective pitch for yaw control. In a second mode of operation, such as when the aircraft 10 is travelling above the first speed, but below a second greater speed, a mix of differential collective and differential cyclic may be used to control yaw. The differential cyclic may be applied along the longitudinal and/or lateral axes of the aircraft 10 as a function of operational states of the aircraft (e.g., take-off, cruise, land, etc.). Further, wind direction, may be measured by a sensor 122 and used to adjust the differential cyclic about the longitudinal and/or lateral axes. Alternatively or in addition, one or more control surface of the aircraft 10 may be adjustable to control yaw.

In addition, coaxial counter-rotating main rotor assemblies, such as main rotor assembly 14, are able to provide yaw control by varying a balance of torque between the upper and lower rotor assemblies. Based at least in part on the state of the flight controls, a (differential) moment may be generated between the upper rotor assembly 18 and the lower rotor assembly 20. The moment may be coupled to the airframe 12 of the aircraft 10 and may correspond to an imbalance in torque that may be harnessed or used to provide yaw control for the aircraft 10. In conventional rotary wing aircrafts, this torque balancing of a coaxial counter-rotating main rotor assembly is achieved through the application of differential collective to the main rotor assembly 14. Because the upper rotor assembly 18 and the lower rotor assembly 20 of aircraft 10 are independently driven about the main rotor axis X via separate electric motors 160a, 160b, the maneuverability of the aircraft 10 is enhanced compared to conventional aircraft. In an embodiment, yaw control of the aircraft 10 may be performed via independent control of the electric motors 160a, 160b. For example, the torque applied by each of the motors 160a, 160b to a corresponding rotor 18, 20 may be controlled independently, such as by selectively increasing the rotational speed of one of the rotors 18, 20 to create a torque imbalance between the upper and lower rotor assemblies 18, 20. This imbalance in torque can be controlled to create yaw of the aircraft in a desired direction and having a desired magnitude. In addition, the independent control of the upper rotor assembly 18 and the lower rotor assembly 20 allows the rotor blades 22 to be indexed to align the rotor blades, for example parallel to the longitudinal axis L of the aircraft 10. Additionally, while in autorotation, the independent control of the upper rotor assembly 18 and the lower rotor assembly 20 allows for individual regenerative rotor braking and re-distributing rotor braking energy to the opposing rotor (i.e. extract torque (electrical energy) from one rotor to speed up the other).

As previously described, a separate electric motor 160a, 160b may be associated with each of the upper rotor assembly 18 and the lower rotor assembly 20 of the main rotor assembly 14. In an embodiment, the electric motor 160a, 160b associated with each rotor 18, 20 is integrated directly into the rotor 18, 20. With reference now to FIGS. 11-18, an example of a rotor having an electric motor integrated therein is illustrated at 200 in more detail. It should be understood that the rotor 200 may be representative of the upper rotor assembly 18, the lower rotor assembly 20, or alternatively, an auxiliary rotor (not shown).

As previously described, the aircraft 10 includes a static mast, such as static mast 78 for example, that is generally stationary relative to the airframe 12. The static mast 78 defines, but does not rotate about an axis of rotation, such as axis X. An elastomeric gimbal 202 is coupled to the static mast 78, for example between the static mast 78 and a stationary rotor hub assembly 204. The elastomeric gimbal 202 is mounted concentrically with the static mast 78, such as via one or more interlocking splines for example, and is configured to allow the rotor hub assembly 204, to pivot or articulate relative to the static mast 78. The elastomeric gimbal 202 provides additional degrees of freedom or movement and allows for a semi-rigid in-plane design resulting in reduced flight loads, component size, and vehicle weight. In addition, the elastomeric gimbal 202 reduces the maintenance and operating costs associated with conventional bearing systems. In an embodiment, the portion 206 of the rotor hub assembly 204 directly adjacent to the static mast 78 is contoured to define at least one bearing interface surface adapted to abut a corresponding surface of the elastomeric gimbal 202.

Figure 13:
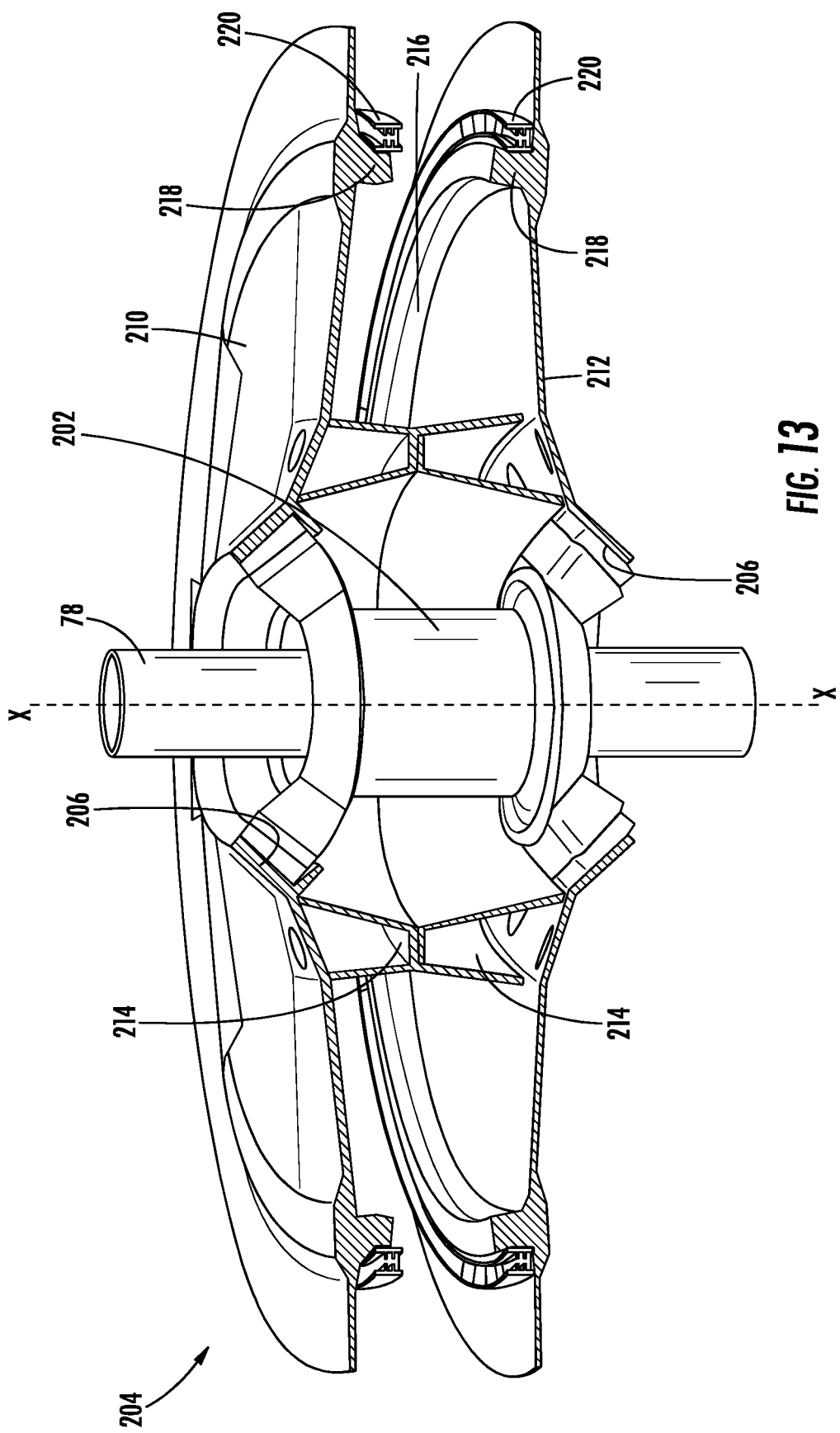
FIG. 13 is a perspective, partially cut away view of a stationary rotor hub assembly of the propulsion system according to an embodiment.
Figure 14:
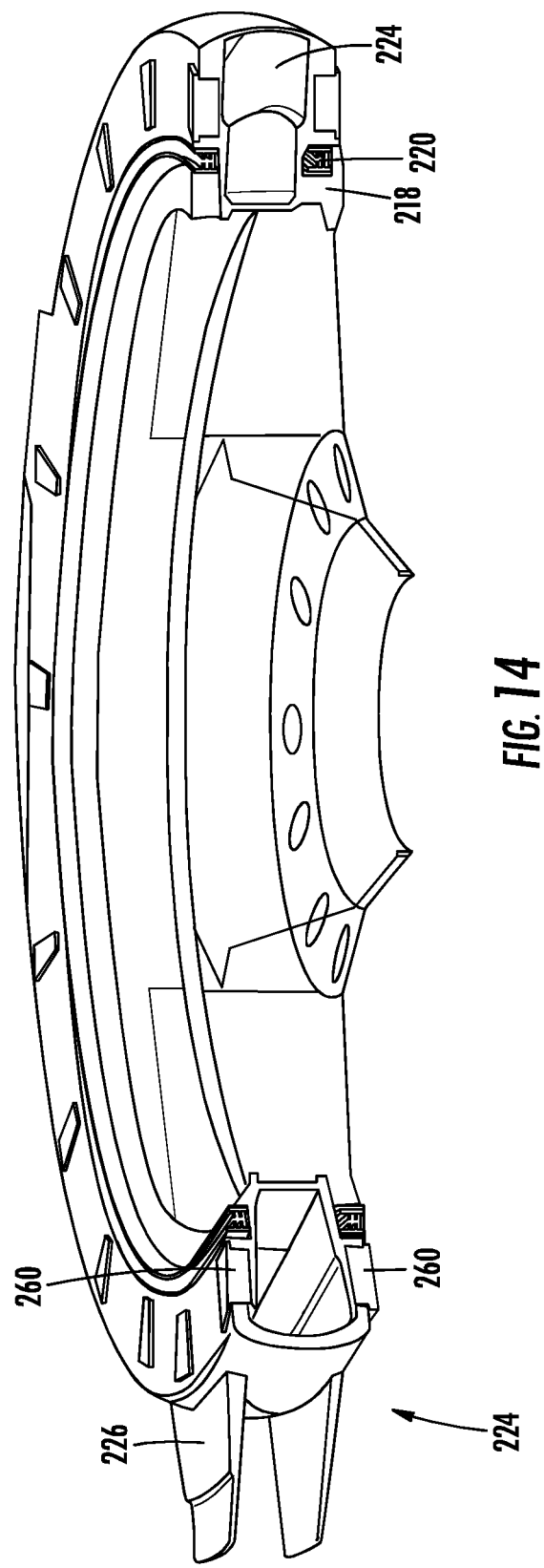
FIG. 14 is a perspective, partially cut away view of a rotating system of the propulsion system according to an embodiment.
Figure 15:
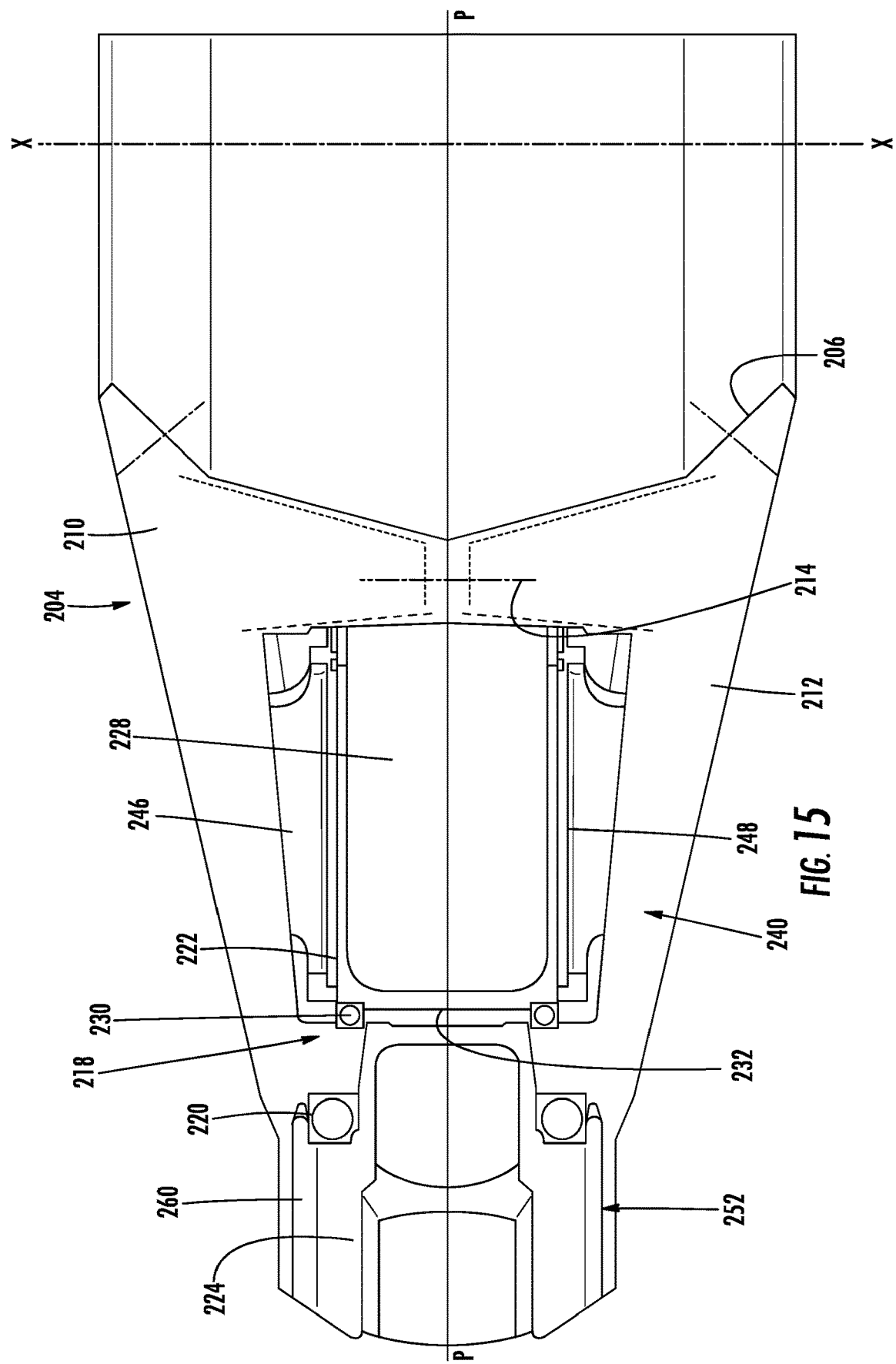
FIG. 15 is a cross-sectional view of a portion of the propulsion system of FIG. 11 according to an embodiment.

A rotor assembly of the aircraft 10 may be similar to a rotor assembly taught or described in any of U.S. patent application Ser. No. 15/434,951 filed on Feb. 16, 2017, U.S. patent application Ser. No. 15/655,670 filed on Jul. 20, 2017, U.S. patent application Ser. No. 15/010,970 filed on Jan. 29, 2016, on Jul. 20, 2017, U.S. patent application Ser. No. 15/295,258 filed on Oct. 17, 2016, U.S. patent application Ser. No. 15/296,625 filed on Oct. 18, 2016, U.S. patent application Ser. No. 15/296,625 filed on Oct. 18, 2016, and U.S. patent application Ser. No. 15/864,702 filed on Jan. 8, 2108. With reference now to FIGS. 13 and 15, in the illustrated, non-limiting embodiment, the stationary rotor hub assembly 204 includes a first, upper rotor hub 210 and a second, lower rotor hub 212. The second rotor hub 212 is complementary to the first rotor hub 210. In an embodiment, the first rotor hub 210 and the second rotor hub 212 are substantially identical and/or are symmetrical about a plane P. Within the rotor hub assembly 204, the first and second rotor hubs 210, 212 are rotated 180 degrees relative to one another such that the rotor hubs 210, 212 generally face one another.

As shown in the FIGS. 13 and 15, each of the first rotor hub 210 and the second rotor hub 212 includes a first rotor hub protrusion 214 extending perpendicularly from an inwardly facing surface of the rotor hub 210, 212 towards the opposite rotor hub 210, 212. The protrusions 214 are generally sized such the distal end of the protrusion 214 of the first rotor hub 210 directly contacts the end of the protrusion 214 extending from the second rotor hub 212. As a result of this engagement between the first and second protrusions 214 and the configuration of the rotor hubs 210, 212 a gap or clearance 216 is formed between the first rotor hub 210 and the second rotor hub 212 outboard of the protrusions 214.

A second rotor hub protrusion 218 may extend from an inward facing surface of the rotor hubs 210, 212 at a location between the first protrusion 214 and the outer periphery of the rotor hub assembly 204. The second rotor hub protrusion 218 of each rotor hub 210, 212 is adapted to support a bearing 220 thereon. In an embodiment, the bearing 220 is a duplex bearing having a race aligned with each of the protrusions 218. As a result, the height of the protrusion 218 may be selected to be generally equal to or slightly larger than a height of the bearing 220.

The rotor 200 additionally includes a rotating system 222 rotatable relative to the stationary rotor hub assembly 204 about the axis X defined by the static mast 78. The rotating system 222 forms a motor output and drives a rigid ring-shaped rotor head 224 mounted concentrically with the hub assembly 204. The rotor head 224 is configured to couple an inboard end of each rotor blade 22 to the static mast 78. As shown, a blade attachment cuff 226 configured to couple to a corresponding rotor blade 22 may be integrally formed with and extend generally outwardly from the outer periphery of the rotor head 224. However, embodiments where the rotating system 222 comprises a plurality of individual yokes spaced about the periphery of the static mast 78 and associated with the plurality of rotor blades 22 are also contemplated herein. As best shown in the FIG. 15, the rotor head 224 is positioned generally adjacent the outboard end of the rotor hub assembly 204 between the first rotor hub 210 and the second rotor hub 212. The rotor head 224 is supported within the rotor hub assembly 204 by the at least one bearing 220 at a position adjacent the second protrusions 218.

Figure 17:
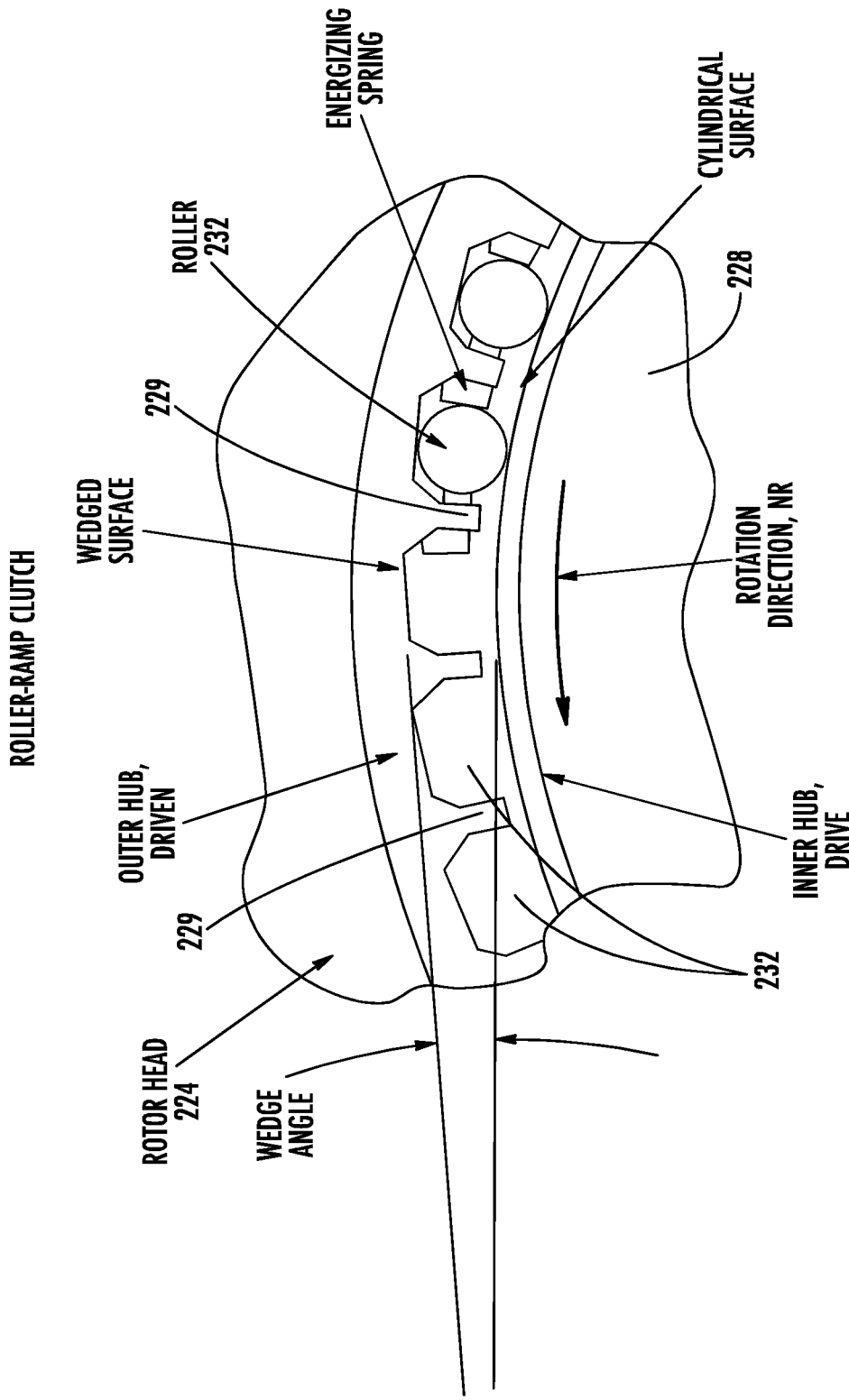
FIG. 17 is a schematic diagram of the interface between the rotor head and the over-running clutch of the rotating system according to an embodiment.

The rotating system 222 of the rotor 200 additionally includes an over-running clutch 228. In an embodiment, the overrunning clutch 228 is generally positioned within the gap formed between the first rotor hub 210 and the second rotor hub 212 between the first protrusion 214 and the second protrusion 218. One or more bearings, such as a duplex bearing set 230 arranged adjacent a corresponding surface of the second protrusion 218, support the over-running clutch 228 within the rotor hub assembly 204. In an embodiment, the overrunning clutch 228 is mounted directly adjacent and in-line with a portion of the rotor head 224. As a result, a direct load path for torque transfer exists between the over-running clutch 228 and the rotor head 224. In the illustrated, non-limiting embodiment, the overrunning clutch 228 is a ramp-roller overrunning clutch. Accordingly, a plurality of rollers 232 is mounted at an interface between the clutch 228 and the rotor head 224 about the periphery of the clutch 228. In an embodiment, the surface of the rotor head 224 adjacent the clutch 228 includes one or more features 229 configured to cooperate with the clutch 228 to transmit rotation between the clutch 228 and the rotor head 224, as shown in FIG. 17.

A fairing assembly 234 generally surrounds the exterior of the stationary rotor hub assembly 204 to environmentally protect the rotor 200 and to enhance the aerodynamic properties thereof, such as by reducing the drag thereof. The fairing assembly 234 may include a plurality of complementary portions, such as a first, upper fairing 236 and a second, lower fairing 238. In an embodiment, the upper and lower fairings 236, 238 are substantially identical and symmetrical about the plane P extending through the interface of the first protrusions 214 and normal to the axis of rotation X. The outboard ends of the upper and lower fairings 236, 238 are separated from one another to define a gap within which the rotating system 222 and the rotor blades 22 coupled thereto can rotate relative to the static mast 78.

An electric motor 240 configured to drive rotation of the plurality of rotor blades 22 about the axis X is integrated into the stationary rotor hub assembly 204 and the rotating system 222. The electric motor 240 includes a stator assembly 242 rigidly coupled to the static mast 78, and a rotor assembly 244 configured to rotate about the axis X, best shown in FIG. 16. The stator assembly 242 includes one or more electromagnetic coils 246 affixed to at least one surface of the rotor hub assembly 204. Wiring (not shown) associated with the at least one electromagnetic coil 246 may extend through a hollow interior of the static mast 78 and along a corresponding rotor hub.

In the illustrated, non-limiting embodiment, electromagnetic coils 246 are affixed to both the first rotor hub 210 and the second rotor hub 212 to form a dual motor arrangement. However, embodiments where only one of the first and second rotor hubs, 210 212 includes electromagnetic coils 246 are also contemplated herein. The total number of electromagnetic coils 246 included in the motor 240 may vary based on the desired performance of the rotor 200. The electromagnetic coils 246 are spaced circumferentially about the static mast 78 and are generally located at a position spaced radially outward from the static mast 78 such as in vertical alignment with the over-running clutch 228 for example.

In embodiments of the rotor 200 having a dual motor arrangement, the electromagnetic coils 246 mounted to the first rotor hub 210 and the second rotor hub portion 212 may be substantially identical, or alternatively, may be different. In addition, the one or more of the electromagnetic coils 246 mounted to the first rotor hub 210 may be vertically aligned with one or more electromagnetic coils 246 mounted to the second rotor hub 212. Alternatively, the one or more electromagnetic coils 246 mounted to the first rotor hub 210 may be staggered relative to the electromagnetic coils 246 mounted to the second rotor hub 212.

The rotor assembly 244 of the motor 240 includes one or more permanent magnets 248 mounted to the rotating system 222, and more specifically, to the over-running clutch 228. As shown, the magnets 248 are mounted to the over-running clutch 228 in vertical alignment with the at least one electromagnetic coil 246 of the stator assembly 242. The spatial positioning between the electromagnetic coils 246 of the stator assembly 242 and the adjacent permanent magnets 248 of the rotor assembly 244 is defined by the clearance between the upper and lower rotor hubs 210, 212 and the bearings positioned therein. In an embodiment, the magnets 248 are fixedly or removably mounted to at least one of an upper surface and a lower surface of the over-running clutch 228. The magnets 248 are generally circumferentially positioned about the over-running clutch 228, concentric with the static mast 78. The magnets 248 may, but need not be, equidistantly spaced about the over-running clutch 228.

Figure 18:
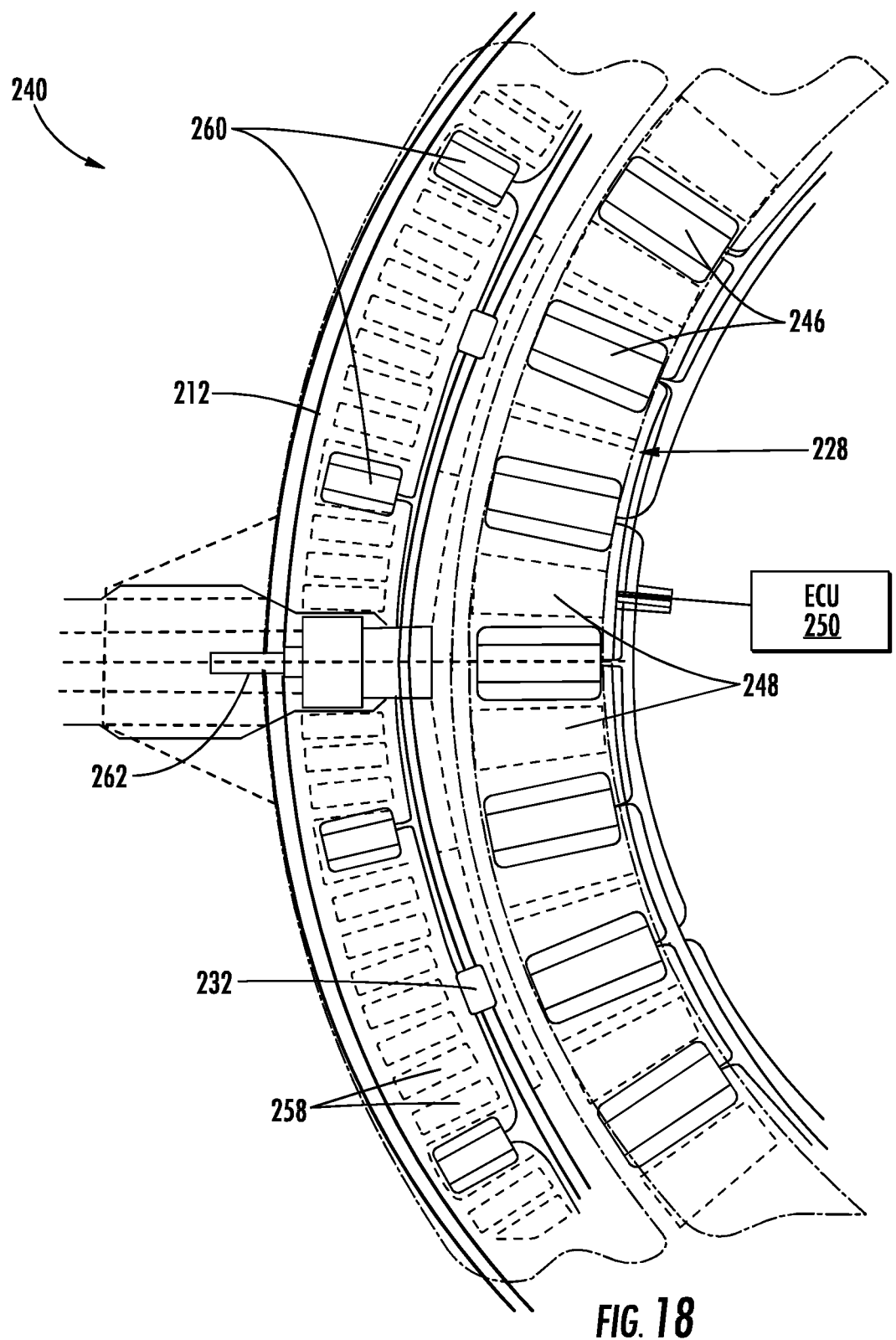
FIG. 18 is a top view of a portion of the electric motor of FIG. 16 according to an embodiment.

The rotor assembly 244 is configured to rotate with respect to the stator assembly 242 and the static mast 78 as the magnets 248 of the rotor assembly 244 react with an induced magnetic field generated when the electromagnetic coils 246 of the stator assembly 242 are energized. As the over-running clutch 228 rotates about the axis X defined by the static mast 78, an energizing spring force coaxes the rollers 232 between the features 229 of the rotor head 224 and the clutch 228. This contact creates friction causing the roller to pinch, or lock-up. As a result of this engagement, torque is transferred from the clutch 228 to the rotor head 224. During operation, all electrical inputs necessary to power the motor 240 reside in the fixed frame of reference, thereby eliminating the need for stationary to rotating power transfer couplings, such as slip rings. A motor electronic control unit (ECU), illustrated schematically at 250 in FIG. 18, is also located in the fixed frame and is operable to control application of electrical energy and signal to the stationary coils 246, thereby providing torque and speed control.

In an embodiment, the rotor 200 additionally includes a power generation system 252. As shown, the power generation system 252 includes a generator stator 254 and a generator rotor 256. In the illustrated, non-limiting embodiment, the generator stator 252 is integrally formed with the rotor hub assembly 204 and includes one or more permanent magnets 258 affixed to at least one surface thereof. As shown, the plurality of permanent magnets 258 are located adjacent an outboard edge of at least one of the upper rotor hub 210 and the lower rotor hub 212. The generator rotor 256 additionally includes one or more electromagnetic coils 260 mounted to the rotating system 222. In the illustrated, non-limiting embodiment, the electromagnetic coils 260 are mounted to one or more surfaces of the rotor head 224 in generally vertical alignment with the permanent magnets 258.

As the electric motor 240 drives rotation of the rotating system 222 relative to the stationary rotor hub assembly 204, the permanent magnets 258 coupled to the rotor hub assembly 204 generate a magnetic field which induces an electrical current in the electromagnetic coils 260 mounted to the rotor head 224. This current induced in the electromagnetic coils 260 of the rotating system 222 may then be used to power one or more components located within the rotating frame of the rotor 200, such as an electromechanical actuator (not shown) configured to control rotation of a corresponding rotor blade 22 about a pitch axis. In such embodiments, the electrical power generation of the electromechanical actuator is self-contained within the rotor head 224, and a wireless system is used for lower power transfer and for communication with the electromechanical actuator. It should be understood that the configuration of a rotor 200 having an electric motor 240 integrated therein illustrated and described herein is intended as an example only, and that an electric motor having any configuration and directly or indirectly coupled to the rotor may be used to drive rotation of the rotor about a corresponding axis.

While in autorotation, the independent control of the upper rotor assembly 18 and the lower rotor assembly 20 allows for individual regenerative rotor braking and redistributing rotor braking energy to the opposing rotor (i.e. extract torque (electrical energy) from one rotor to speed up the other). In autorotation, the rotor head 224 of at least one of the upper and lower rotor assemblies 18, 20 is aerodynamically back driven about the axis of rotation X by the upward forces acting on the rotor blades 30. Operation of the differential collective to provide yaw control of the aircraft 10 during autorotation is typically limited. In an embodiment, the power generation system 252 is operable to provide directional control of the aircraft 10 during autorotation. The power generation system 252 may be used in a manner similar to a regenerative braking system to control the torque of the rotor head 240. The interaction between the permanent magnets 258 of the generator stator 254 and the induction type magnets 260 of the generator rotor 256 results in a default torque acting on the rotor head 240. To change the torque of the rotor head 240 from this default torque, power, such as from an energy storage device for example, is selectively provided to the induction type magnets 260 of the generator rotor 256. By modulating the magnitude of the current provided to the induction type magnets 260 or the resulting magnetic flux, the torque of the rotor head 240 can be controlled to achieve a torque that is different than the default torque. This modulation may be used to either increase or decrease the torque relative to default torque.

Figure 20:
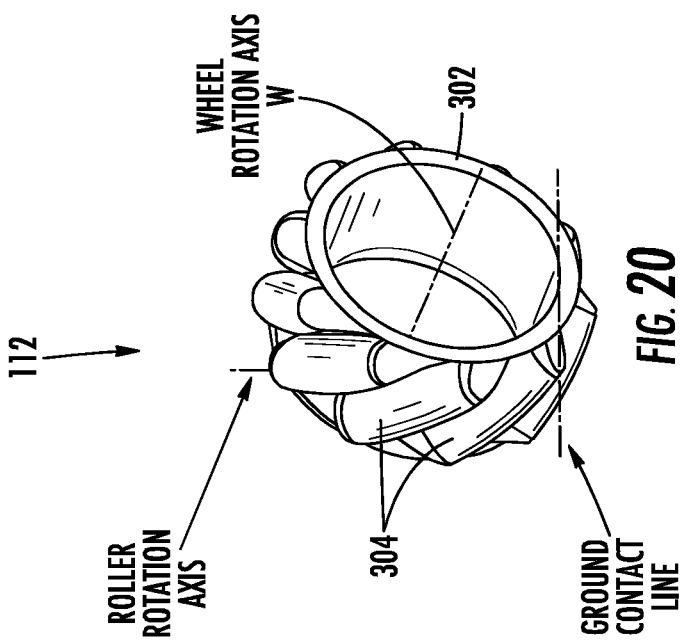
FIG. 20 is a perspective view of a ground contact member of the landing gear assembly according to an embodiment.
Figure 19:
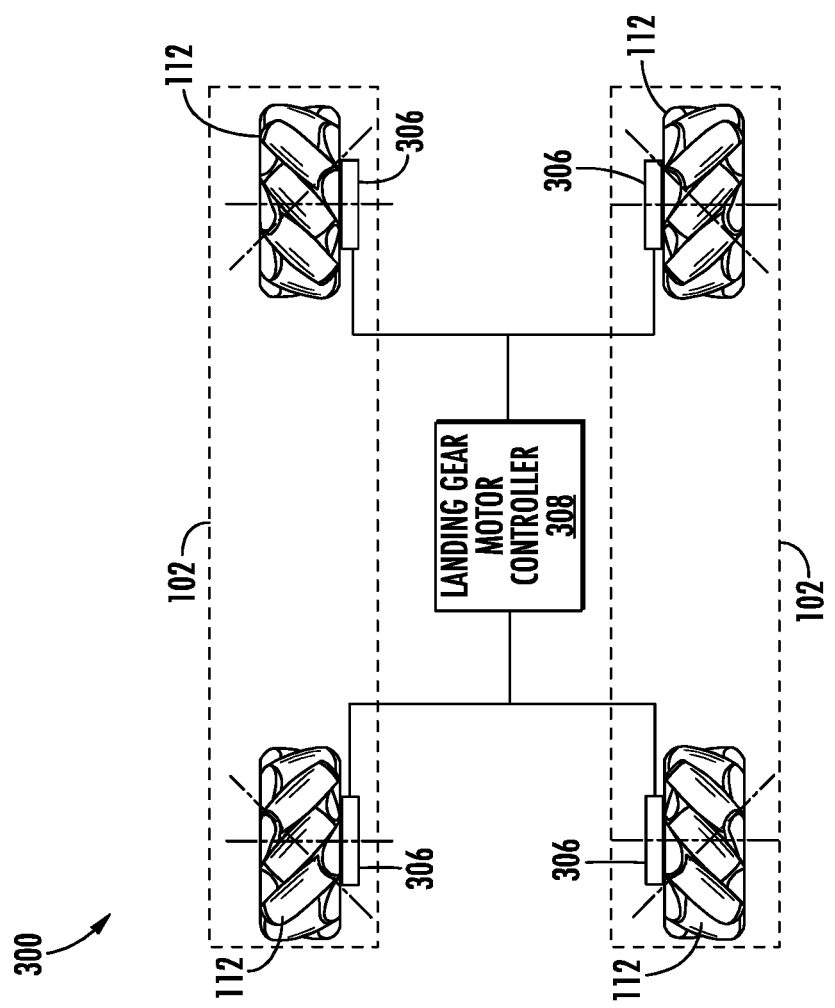
FIG. 19 is a schematic diagram of a landing gear propulsion system according to an embodiment.

With reference now to FIGS. 19 and 20, in an embodiment, a propulsion or drive system 300 is integrated into the landing gear system 100 and is operable to maneuver the aircraft 10 when landed, such as during ground operation and taxiing for example. In embodiments where the landing gear system 100 includes a propulsion system 300, at least one or all of the ground contact members 112 of the landing gear system 100 may be wheels having multiple degrees of freedom to allow the wheels to move in any direction without changing the orientation of the aircraft 10. An example of a wheel 112 movable in multiple degrees of freedom is shown in FIG. 20. As shown, the wheel 112 includes hub or support 302 rotatable about a wheel axis of rotation W. A plurality of rollers 304 are positioned adjacent to one about the outer circumference of the hub 302 and are mounted such that each roller 304 is rotatable about a roller axis of rotation R arranged at an angle relative to the wheel axis of rotation W. As a result, the wheel 112 contacts the ground or another surface along a line. In an embodiment, the angle of the rollers 304 of the wheel that forms the first ground contact member 112 of a landing gear assembly 102 and the angle of the rollers 304 of the wheel that forms the second ground contact member 112 of a landing gear assembly 102 may be different. For example, the angles may be equal, but opposite, as shown in FIG. 19.

Figure 21:
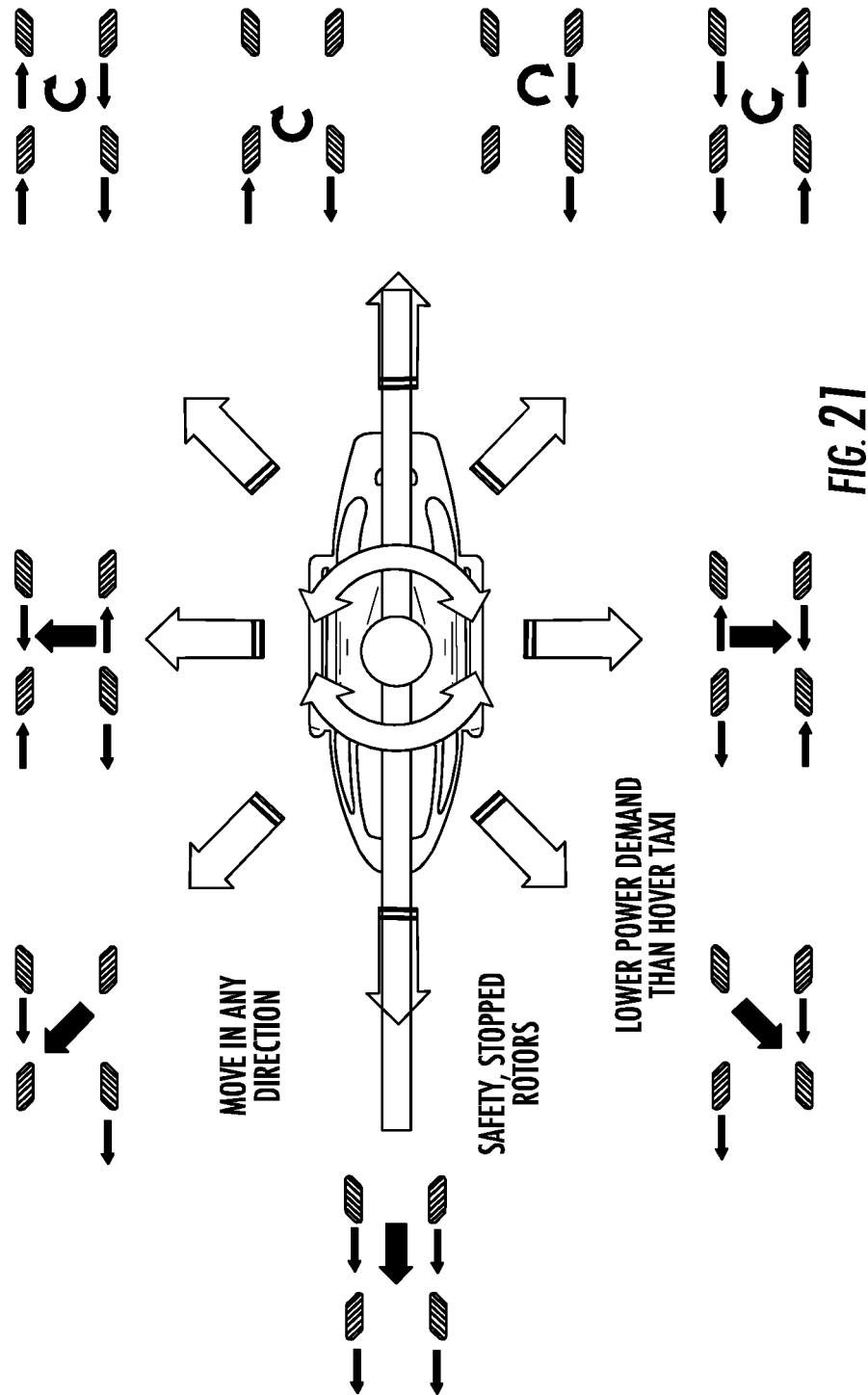
FIG. 21 is a diagram illustrating a control scheme for various types of movement of the aircraft according to an embodiment.

By including ground contact members 112 with multiple degrees of freedom, the aircraft 10 can be made to move in any direction and turn by varying the speed and direction of rotation of one or more of the wheels 112. An example of how the wheels 112 may be operated to move the aircraft in various directions is shown in FIG. 21. For example, rotating or driving all four wheels 112 (one associated with each landing gear support 104, 108) in the same direction at the same rate causes forward or backward movement; rotating the wheels 112 mounted to one landing gear assembly 102 at the same rate but in an opposite direction as rotation of the wheels 112 coupled to the other landing gear assembly 102 mounted at the opposite side of the aircraft 10 will cause the aircraft 10 to rotate. Examples of such wheels 112 include mecanum wheels, holonomic wheels, and omni wheels for example.

In the illustrated, non-limiting embodiment, each of the wheels 112 has a respective drive motor, illustrated schematically at 306 operably coupled thereto, for rotating the wheel about its wheel axis of rotation W. Such wheels may be referred to as "drive wheels." However, embodiments wherein only a portion of the wheels 112 of the landing gear system 100 have a drive motor associated therewith are also within the scope of the disclosure. In such embodiments, the wheels 112 that do not have a drive motor 306 associated therewith are considered passive or driven wheels.

In embodiments where only a portion of the wheels supports are driven by a drive motor 306, various configurations of the drive wheels and the passive wheels are contemplated herein. For example, the drive wheels may be mounted to the pair of first landing gear supports 104 and the passive wheels mounted to the pair of second landing gear supports 108. In another embodiment, the drive wheels are attached to the second landing gear support 108 of each landing gear assembly 102, or alternatively, the drive wheels may be attached to a first landing gear support 104 of a first landing gear assembly 102 and to a second landing gear support 108 of a second landing gear assembly 102, on a diagonal, as shown in FIG. 20. Although each drive motor 306 is illustrated as being coupled to a single ground contact member 112, embodiments where a drive motor 306 is operably coupled to multiple ground contact members 112 to impart selective or simultaneous movement thereto are also within the scope of the disclosure. In addition, although only a portion of the ground contact members 112 are illustrated and described as being driven, in other embodiment, each of ground contact members 112 may be driven.

The drive motors 306 coupled to the drive wheels 112 are operably coupled to a landing gear motor controller 308. The landing gear motor controller 308 is operable to provide one or more commands to the drive motors 306 individually or in combination to control movement of the aircraft 10 while grounded. In an embodiments, the commands generated by the landing gear motor controller 308 may be generated in response to an input, such as inputs 126 or sensor input 122, provided to the FCC 124. The landing gear motor controller 308 may be separate from and arranged in communication with the flight control computer FCC 124 as shown, or alternatively, the FCC 124 may function as the landing gear motor controller 308. Further, the landing gear motor controller 308 may be configured to communicate with the drive motors 306 wirelessly, or via a wired connection.

Noise control, such as of exterior noise in urban environments and interior noise, for example within the cabin, is a primary concern for rotary wing aircraft. Several sources of noise are typically present during normal operation of a rotary wing aircraft. For example, the rotor blades generate thickness noise based on their shape, loading, and motion. This noise tends to occur in the plane of the rotor disk and occurs within a frequency range that is easily detectable. In addition, rotation of the rotor blades about a rotor axis creates blade vortex interaction or blade slap. Blade slap is generated by interaction of blade tip vortices with the rotor blades and may result in the production of objectionable noise. Further, the tail rotor or translational thrust system, the engines, and the gearbox coupling the engines to the rotor systems are also responsible for the creation of noise. Together, these noise sources result in the generation of vibrations, typically having a frequency between approximately 300 to 1000 Hz).

One or more parameters of the aircraft 10 illustrated and described herein have been optimized to reduce the acoustic signature of the aircraft 10. Because perceived loudness of sound is related to the frequency at which the noise occurs, the aircraft noise may be reduced by limiting the frequency of the noise generated by the main rotor system 14. In an embodiment, the frequency of the noise of the aircraft 10 is generally less than 1000 Hz, and primary less than 100 Hz, and has a sound loudness value generally less than 60 phon and primarily less than 20 phon observed at a direct-line distance of 150 ft at an angle of 45 degrees from the ground plane.

The frequency of the noise is in part controlled by the speed of rotation and the diameter of the rotor assemblies 18, 20 of the main rotor system 14. For example, the frequency is proportional to the rotor tip speed and is inversely proportional to the diameter of the rotor assemblies 18, 20. In an embodiment, the tip speed of the upper and lower rotor assemblies 18, 20 of the main rotor system 14 in flight is decreased or less than the tip speed of conventional coaxial rotor systems because sound pressure is proportional to speed.

In an embodiment, the diameter of the upper and lower rotor assemblies 18, 20 of the main rotor system 14 is increased compared to conventional coaxial rotor systems because sound pressure occurs at a lower frequency as rotor diameter increases. Rotor size may be determined by disk loading, which is the weight per disk area. The aircraft 10 has a low rotor disk loading compared to conventional aircraft 10. In the illustrated, non-limiting embodiment, the rotor disk loading is between 2-3 lbs/sq. ft. compared to between 5-7 lbs/sq. ft. for existing comparably sized rotary wing aircraft, or between 30-100 lbs/sq. ft. for other vertical takeoff and landing aircraft having an electrical propulsion system. In addition the design of the rotor blades 22 mounted to the upper and lower rotor assemblies 18, 20 of the main rotor assembly 14 may be selected to reduce the noise generated by the movement of the rotor blade assemblies through the air.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An aircraft comprising:
an airframe;
a coaxial main rotor assembly including a static mast, and an upper rotor assembly and a lower rotor assembly rotatable about a main rotor axis defined by the static mast, wherein the upper rotor assembly and the lower rotor assembly are independently rotatable about the static mast;
a propulsion system including:
propulsion sources for directly driving at least one of the upper rotor assembly and the lower rotor assembly, wherein the propulsion sources comprise:
a first propulsion source directly coupled to the upper rotor assembly, the first propulsion source being operable to rotate the upper rotor assembly about the main rotor axis in a first direction; and
a second propulsion source directly coupled to the lower rotor assembly, the second propulsion source being independent from the first propulsion source and operable to rotate the lower rotor assembly about the main rotor axis in a second direction; and a flight control system operably coupled to the propulsion system, the flight control system being operable to independently control a rotational speed of the upper rotor assembly and the lower rotor assembly relative to the static mast, wherein the flight control system is operably coupled to the first propulsion source and the second propulsion source, wherein the flight control system is operable to control aircraft yaw via operation of the first propulsion source and the second propulsion source.

2. The aircraft of claim 1, wherein a blade pitch of the upper rotor assembly and a blade pitch of the lower rotor assembly are controllable by the flight control system.

3. The aircraft of claim 1, wherein the propulsion sources include an electric motor.

4. The aircraft of claim 1, wherein both the first propulsion source and the second propulsion source are electric motors.

5. The aircraft of claim 1, wherein the first propulsion source is mounted within the upper rotor assembly and the second propulsion source is mounted within the lower rotor assembly.

6. The aircraft of claim 1, wherein the airframe further comprises a static mast defining the main rotor axis, and the upper rotor assembly and lower rotor assembly are rotatable relative to the static mast.

7. The aircraft of claim 6, wherein at least one of the upper rotor assembly and the lower rotor assembly includes:
   a stationary rotor hub assembly;
      a rotating system rotatably mounted to the stationary rotor hub assembly; and
   an electric motor including a stator assembly associated with the rotor hub assembly and a rotor assembly associated with the rotating system.

8. The aircraft of claim of claim 5, wherein the rotating system includes a rotor head associated with an over-running clutch.

9. The aircraft of claim 8, wherein the rotor assembly is driven by the over-running clutch.

10. The aircraft of claim 1, wherein at least one of the upper rotor assembly and the lower rotor assembly includes a power generation unit.

11. The aircraft of claim 10, wherein the flight control system is operably coupled to the power generation unit, the flight control system being operable to alter a torque of the at least one of the upper rotor assembly and the lower rotor assembly without decreasing a rotational speed of the at least one of the upper rotor assembly and the lower rotor assembly.

* * * * *